(12) United States Patent
Safwat et al.

(10) Patent No.: US 6,357,164 B1
(45) Date of Patent: Mar. 19, 2002

(54) CELL DESIGN FOR A TRAWL SYSTEM AND METHODS

(75) Inventors: Sherif Safwat, Davis, CA (US); Valentin G. Perevoshchikov, Kaliningrad (RU)

(73) Assignee: OTTR Ultra-Low-Drag, Ltd., Cayman Islands ( * ) Notice: Subject to any disclaimer, the term of this patent is extended or adjusted under 35 U.S.C. 154(b) by 0 days.

(21) Appl. No.: 09/403,121

(22) PCT Filed: Apr. 14, 1998

(86) PCT No.: PCT/US98/07848
§ 371 Date: Feb. 23, 2000
§ 102(e) Date: Feb. 23, 2000

(87) PCT Pub. No.: WO98/46070
PCT Pub. Date: Oct. 22, 1998

Related U.S. Application Data

(60) Provisional application No. 60/043,618, filed on Apr. 14, 1997.

(51) Int. Cl.[7] .......................... A01K 73/02; A01K 75/00
(52) U.S. Cl. ........................................... 43/9.1; 43/9.95
(58) Field of Search ....................... 43/7, 9.1, 9.95, 43/9.8; 87/12

(56) References Cited

U.S. PATENT DOCUMENTS

| | | | | |
|---|---|---|---|---|
| 1,026,544 A | * | 5/1912 | Yamamoto | 43/7 |
| 1,552,269 A | * | 9/1925 | Brocker | 43/7 |

(List continued on next page.)

FOREIGN PATENT DOCUMENTS

| | | |
|---|---|---|
| DE | 3543253 A1 | 6/1987 |
| FR | 002521065 A | 8/1983 |
| JP | 57-13660 | 3/1982 |
| JP | 60-39782 | 3/1982 |
| JP | 59-71630 * | 4/1984 |
| JP | 60-30630 * | 2/1985 |
| JP | 60-88160 * | 5/1985 |
| JP | 60-139860 * | 7/1985 |
| JP | 61-386 | 8/1986 |
| RU | 1444981 | 12/1986 |
| RU | 1480792 A1 | 5/1989 |
| RU | 1480792 A1 | 5/1989 |
| WO | WO 91/01633 * | 2/1991 |
| WO | WO 95/06405 * | 3/1995 |
| WO | WO 97/13407 * | 4/1997 |

OTHER PUBLICATIONS

Batill, S.M., et al., "Flow Field Studies on Yawed, Stranded Cables," in *Flow Visualization V*, R. Řezniček ed., Hemisphere Publishing Corp., pp. 391–396 (1990).

Mehta, Rabindra D., "Aerodynamics of Sports Balls," *Ann. Rev. Fluid Mech.* 17:151–189 (1985).

(List continued on next page.)

*Primary Examiner*—Darren W. Ark
(74) *Attorney, Agent, or Firm*—D. E. Schreiber

(57) ABSTRACT

Mesh bars (35, 283) of a trawl (13, 263) include at least a portion having a corkscrew-shaped pitch which exhibits a hydrofoil-like effect. Such mesh bars (35, 283) are preferably formed from a material having a substantially incompressible cross-sectional shape. By appropriately selecting the lay and leading edge of mesh bars (35, 283), movement of the trawl (13, 263) through the water entrained environment creates a pressure differential and lift across that portion of mesh bars (25, 283) which exhibit the hydrofoil-like effect. The lift thus created increases performance characteristics of the trawl (13, 263) including increased trawl volume, improved trawl shape, and reduced vibration, noise, and drag. Obtaining the greatest improvement of trawls (13, 263) requires controlling a pitch range for twisted product strands (e.g. twisted ropes) (36, 37), and for straps (284) forming mesh bars (35, 283). For straps (284), control of a width to thickness ratio also significantly affects performance of the trawl (13, 263).

7 Claims, 19 Drawing Sheets

U.S. PATENT DOCUMENTS

| | | | | | |
|---|---|---|---|---|---|
| 1,897,224 | A | * | 2/1933 | Andrews | 43/9.95 |
| 2,162,115 | A | * | 6/1939 | Pauls | 43/9.95 |
| 2,511,057 | A | * | 6/1950 | Guthrie et al. | 43/9.95 |
| 2,590,586 | A | * | 3/1952 | Thompson, Jr. et al. | 43/12 |
| 2,792,617 | A | * | 5/1957 | Haller | 87/12 |
| 2,816,386 | A | * | 12/1957 | Harris et al. | 43/9.95 |
| 2,823,576 | A | * | 2/1958 | Needham et al. | 87/12 |
| 2,999,413 | A | * | 9/1961 | Momoi | 87/12 |
| 3,041,915 | A | * | 7/1962 | Ryffel | 87/12 |
| 3,102,357 | A | * | 9/1963 | Luketa | 43/9.8 |
| 3,129,632 | A | * | 4/1964 | Starr | 87/12 |
| 3,131,501 | A | | 5/1964 | Luketa | |
| 3,153,297 | A | * | 10/1964 | Grabowsky | 43/7 |
| 3,308,567 | A | | 3/1967 | Luketa | |
| 3,369,317 | A | * | 2/1968 | Brownell | 43/7 |
| 3,606,815 | A | * | 9/1971 | Yamashita et al. | 87/12 |
| 4,356,654 | A | * | 11/1982 | Trekel et al. | 43/9.1 |
| 4,457,959 | A | * | 7/1984 | Dornheim et al. | 43/7 |
| 4,466,331 | A | * | 8/1984 | Matheson | 87/12 |
| 4,521,986 | A | * | 6/1985 | Koga | 43/9.95 |
| 5,339,657 | A | * | 8/1994 | McMurray | 87/12 |
| 5,453,190 | A | * | 9/1995 | Martin, Sr. | 43/7 |
| 5,752,459 | A | * | 5/1998 | Rexroad | 87/12 |

OTHER PUBLICATIONS

"Knuckleballs," *Scientific American*, p. 22 (1987).

Breidenthal, Robert E., article on bluff body aerodynamics of sports balls, *Trawl System Cell Design and Methods* (1998).

Diggs, Jesse S., "Hydrodynamic Characterization of Various Towed Array Towcables," Towed Systems Branch, Naval Ship Research and Development Center, Bethesda, Maryland (1974).

Endeco, Inc., "Haired Faired™ Cable," *Endeco Towed Systems* (date unknown).

The Zippertubing Co. product data sheets and bulletins for DVH–20 and DVH–40 cable fairings, specifications, and installation (date unknown).

Flugwiss, Z., Weltraumforsch 14, p. 40 (date unknown).

Breidenthal, R., *Phys. Fluids*, vol. 23, No. 10, p. 1931 (1980).

"On the Persistence of Transition in the Near–Wake," pp. 607 and 609. *Problems of Hydrodynamics and Continuum Mechanics, Soc. Industrial and Appl. Math.*, Philadelphia (1969).

Williamson, C.H.K., "Oblique and Parallel Modes of Vortex Shedding in the Wake of a Circular Cylinder at Low Reynolds Numbers," *Journal of Fluid Mechanics* 206:595 and 597, 1989.

Hunt, J.C.R., "Industrial and Environmental Fluid Mechanics," *Annual Review of Fluid Mechanics* 23, pp. 10–12 (1991).

Lisoski graph, Fig. 7, Experimental Lift and Drag histories for bluff plate (thickness=10%), p. 95 (1993).

Roshko, A., "Perspectives on Bluff Body Aerodynamics," *Second International Colloquium on Bluff Body Aerodynamics and Applications*, Melbourne, 7–10, pp. 81 (1992).

Cermak, J.E., "Aerodynamics of Buildings," *Annual Review of Mechanics* 8 p. 99 (1976).

Hoerner, S.F., "Fluid–Dynamic Drag," published by author, pp. 3–2 and 4–4 (1965).

Hoerner, S.F., "III—Pressure Drag," published by author, pp. 3–7, 3–9, 3–11, and 3–27 (1965).

Hoerner, S.F., "IV—Structures," published by author, p. 4–5 (1965).

Examples of Spectrum products, specific projects and end–users, Spectrum Ocean Systems Limited, Peterborough, Ontario (date unknown).

"Fairing and Anti–Stacking Ring Assemblies for Tow-Cables," Spectrum Ocean Systems Limited, Peterborough, Ontario (date unknown).

Oceanographic Ribbon Fairing Cable, The Rochester Corporation, Cat–82 (date unknown).

Nebres, Jose V., "Wake Similarity and Vortex Formation for Two–Dimensional Bluff Bodies," Doctoral Dissertation, University of Notre Dame, Indiana (1992).

Batill, S.M., et al., "Detailed Near Surface Flow About Yawed, Stranded Cables," Coastal Systems Station, Dehlgren Division, Naval Surface Warfare Center, Panama City, Florida (1992).

Nebres, Jose V., "Flow Around Yawed Stranded Cables," Master's Thesis, University of Notre Dame, Indiana (1989).

Batill, S.M.. et al., "An Experimental Investigation of the Flow Field Around Yawed Stranded Cables," Naval Coastal Systems Center, Panama City, Florida (1989).

* cited by examiner

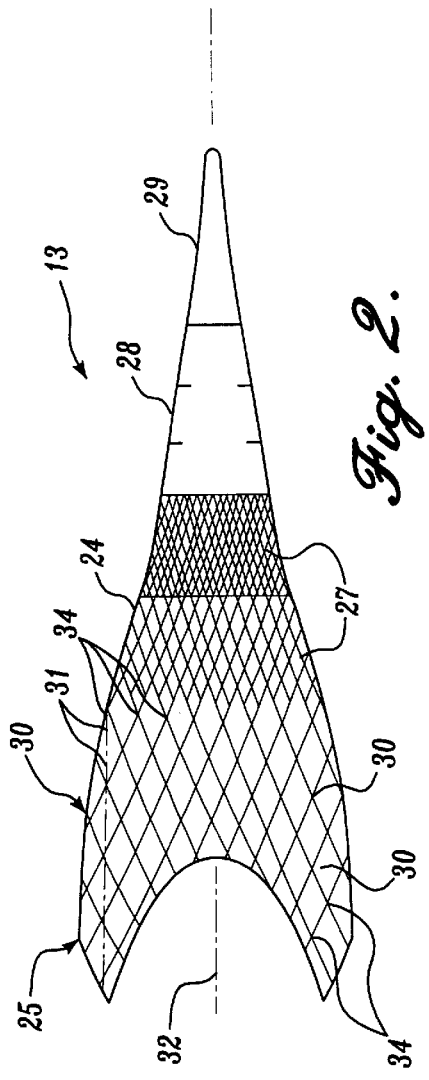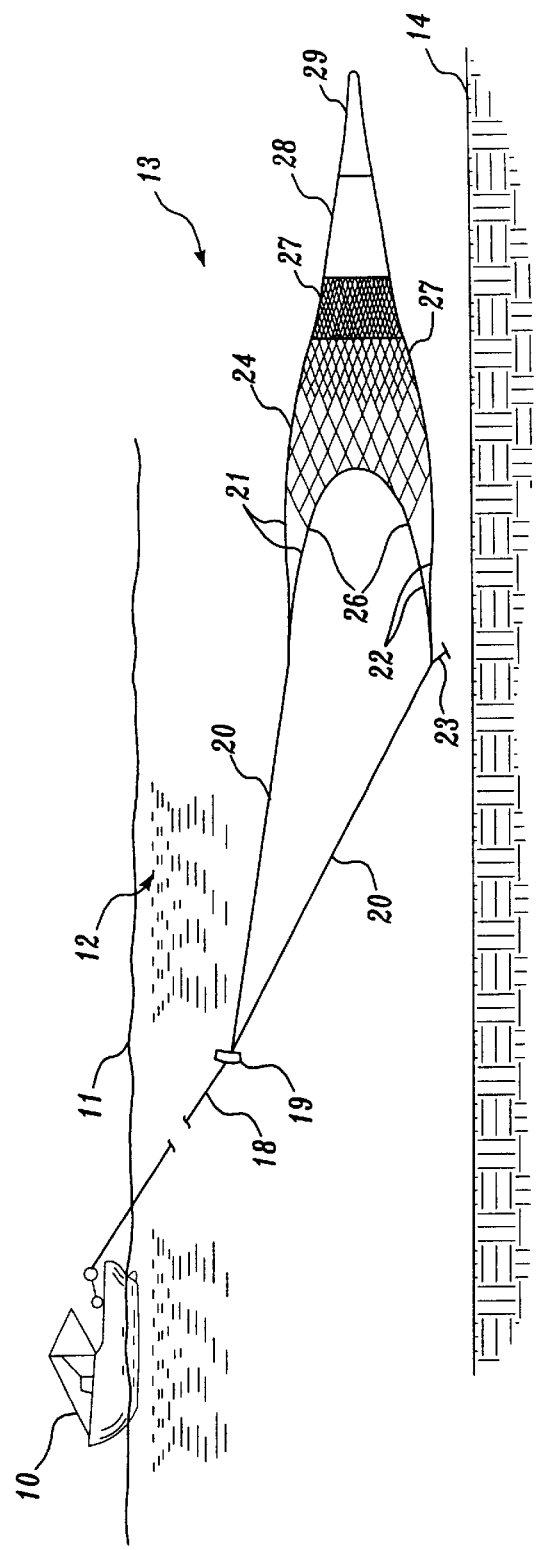
Fig. 2.
Fig. 1.

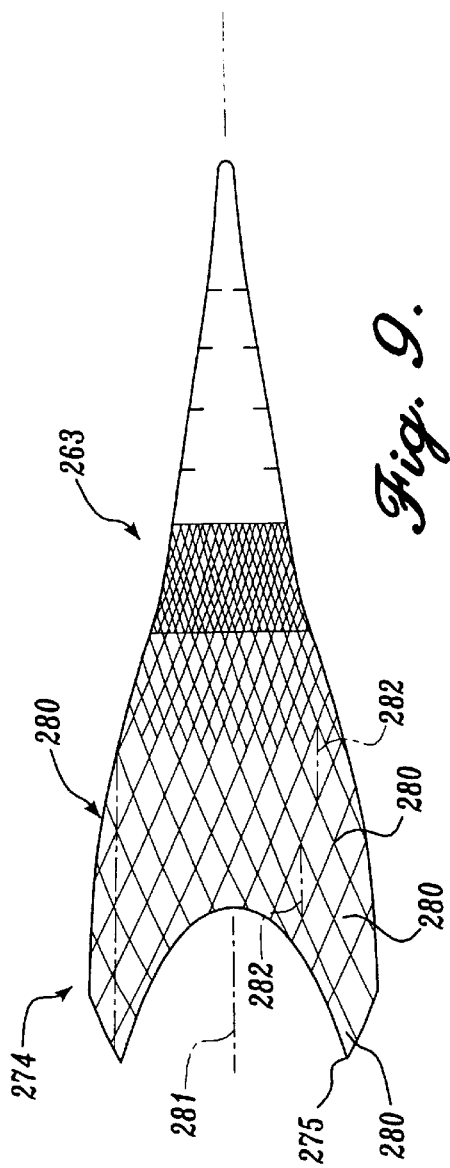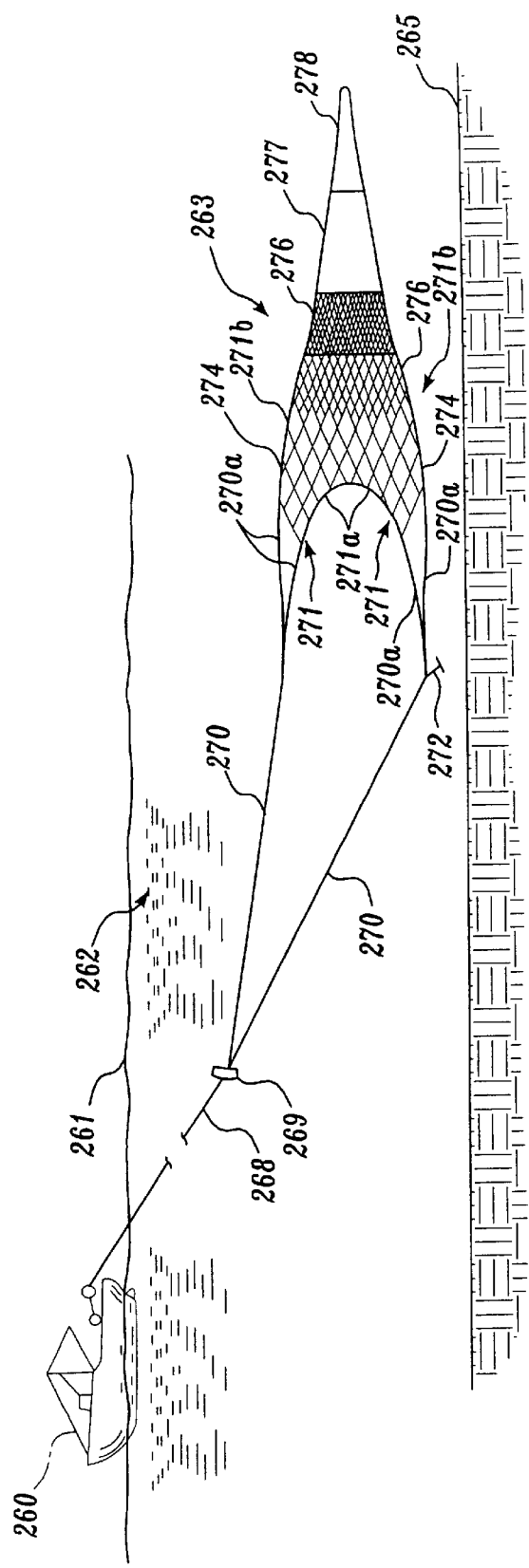

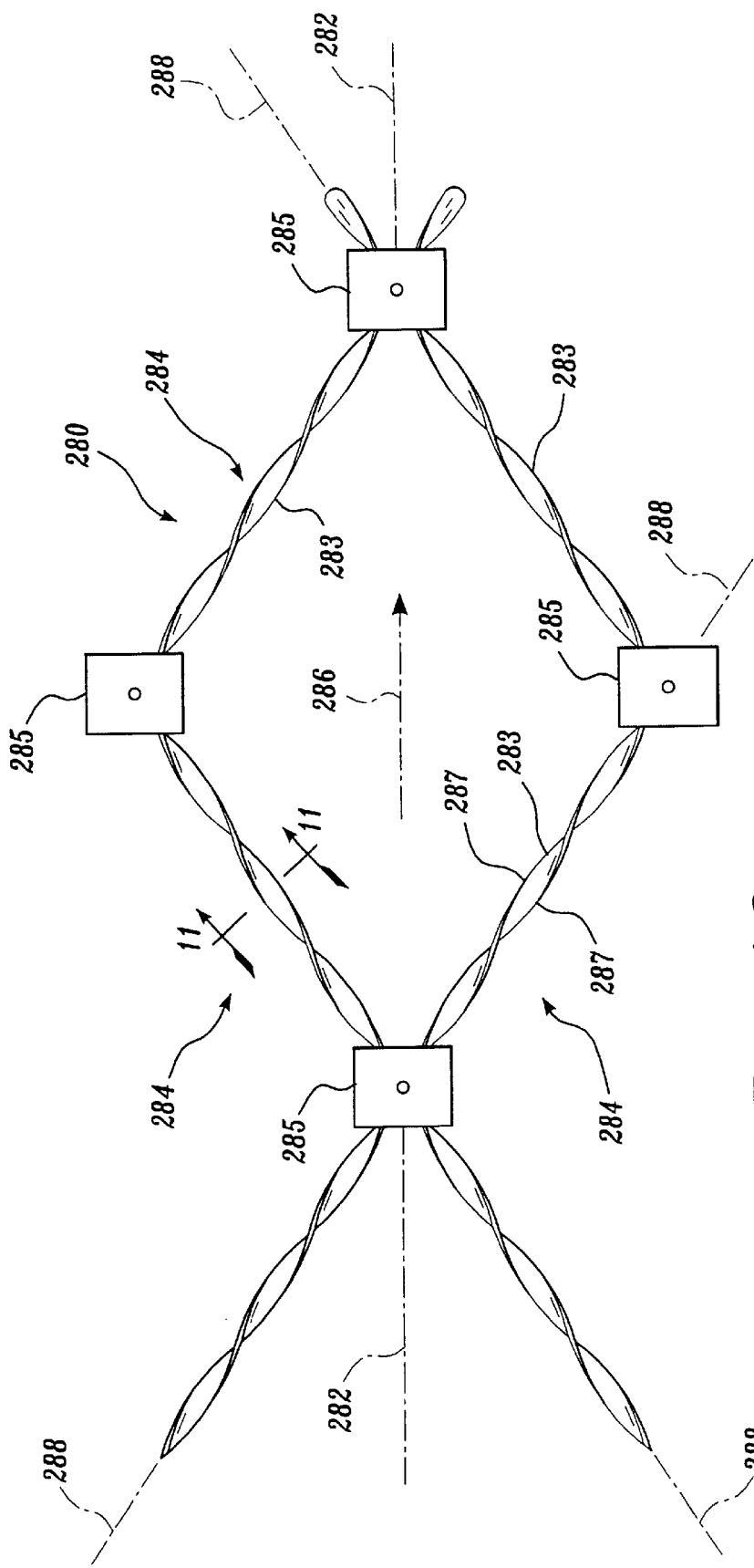

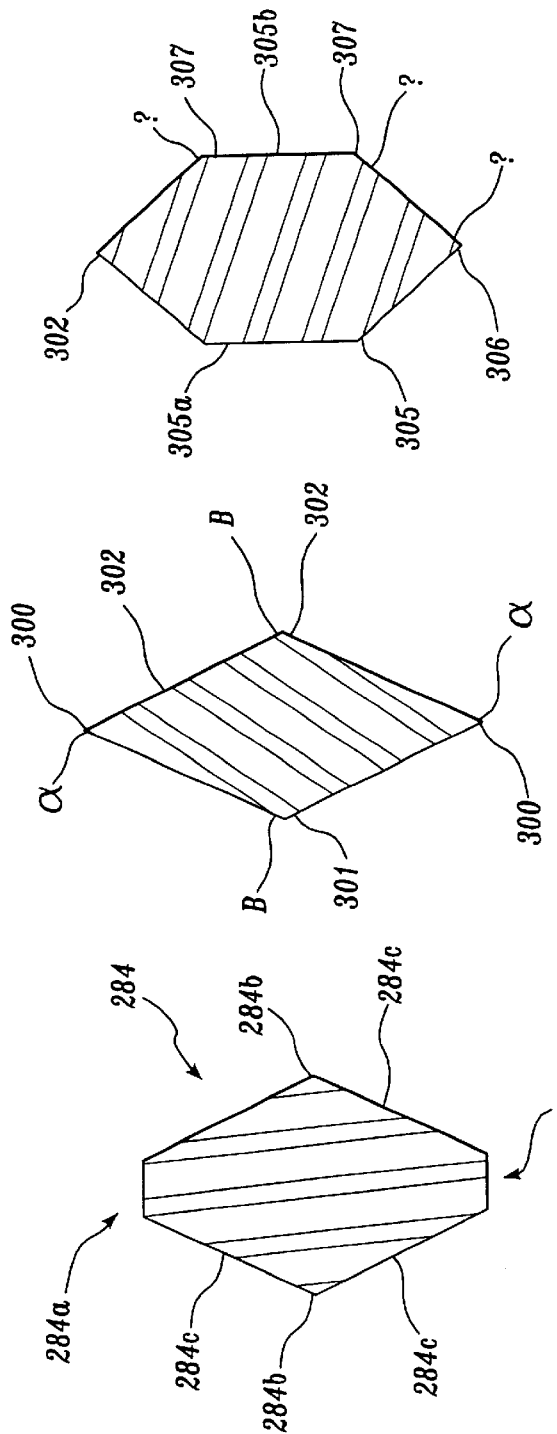

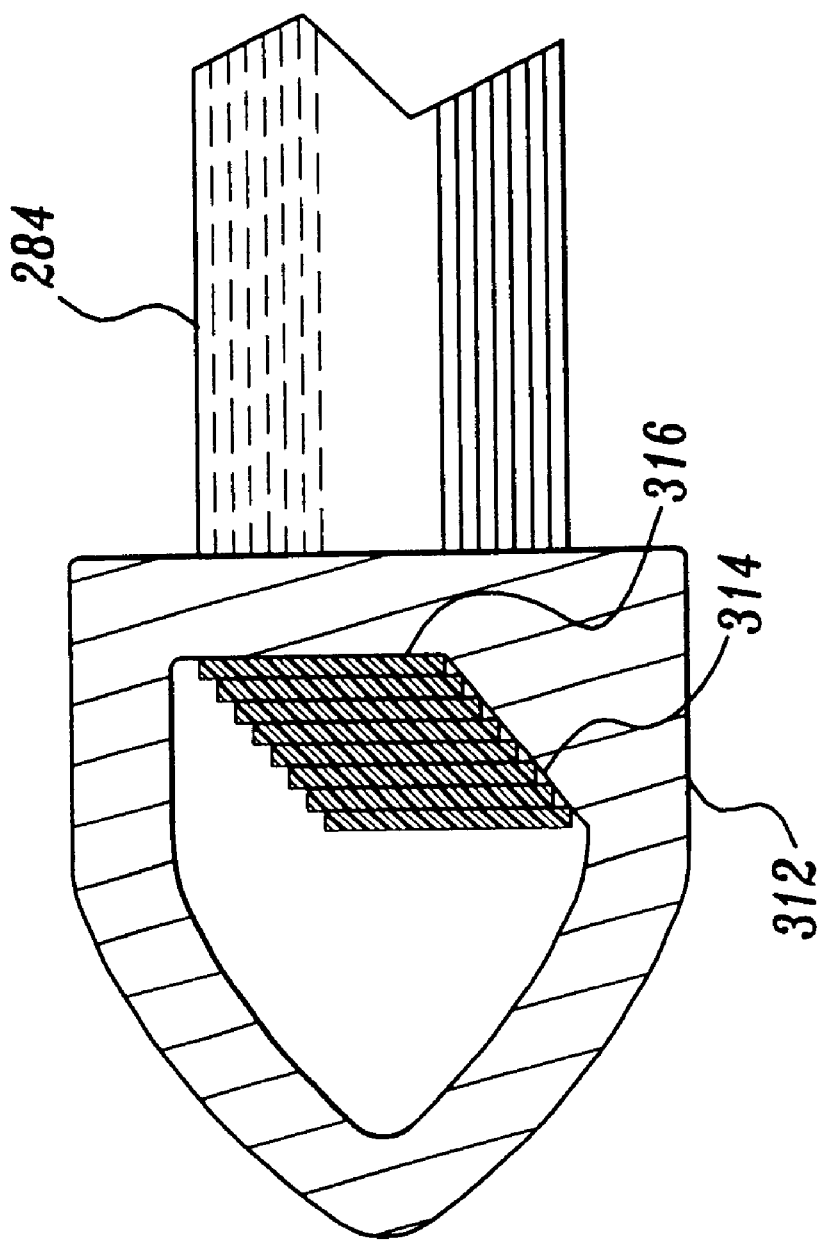

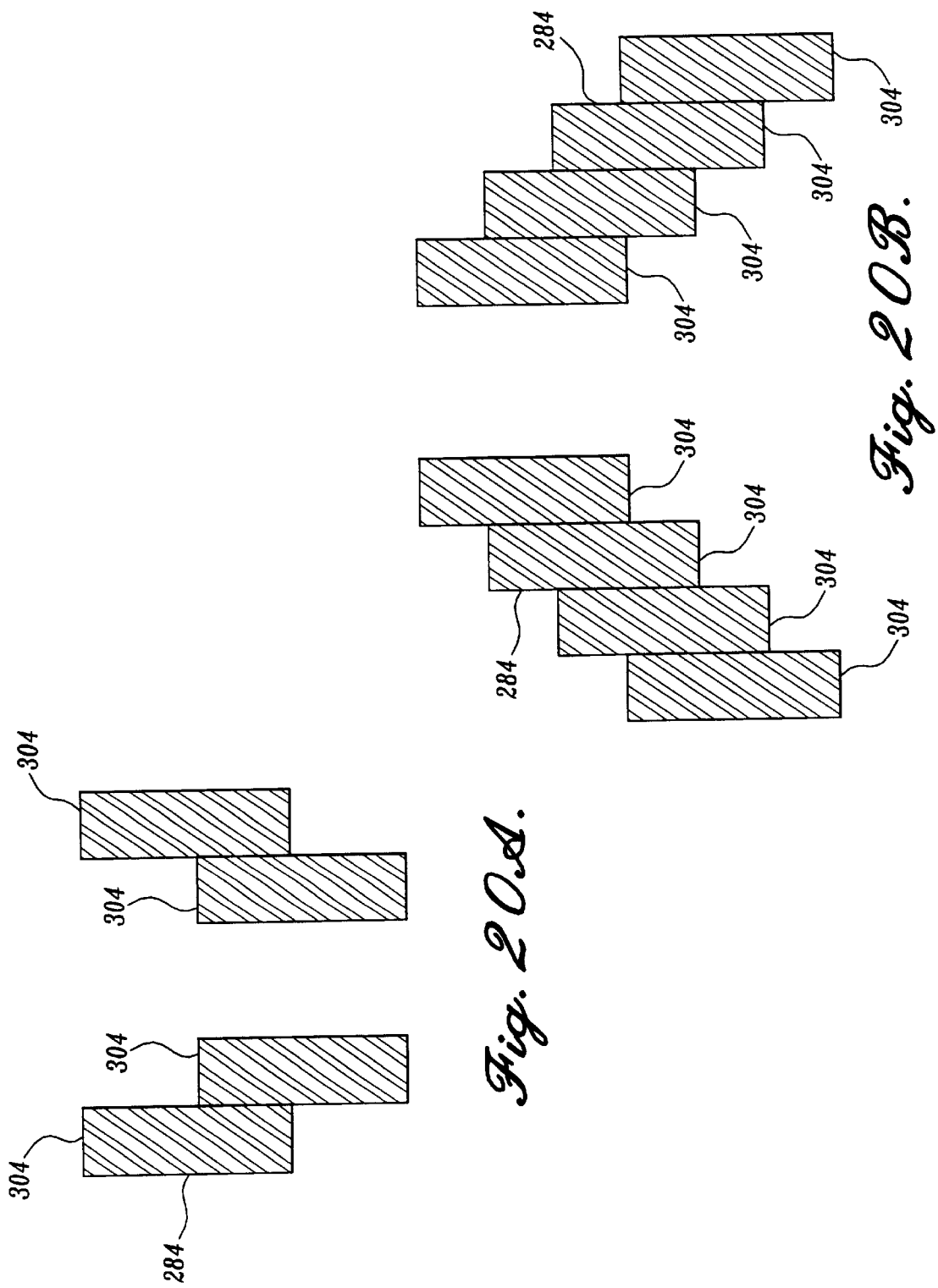

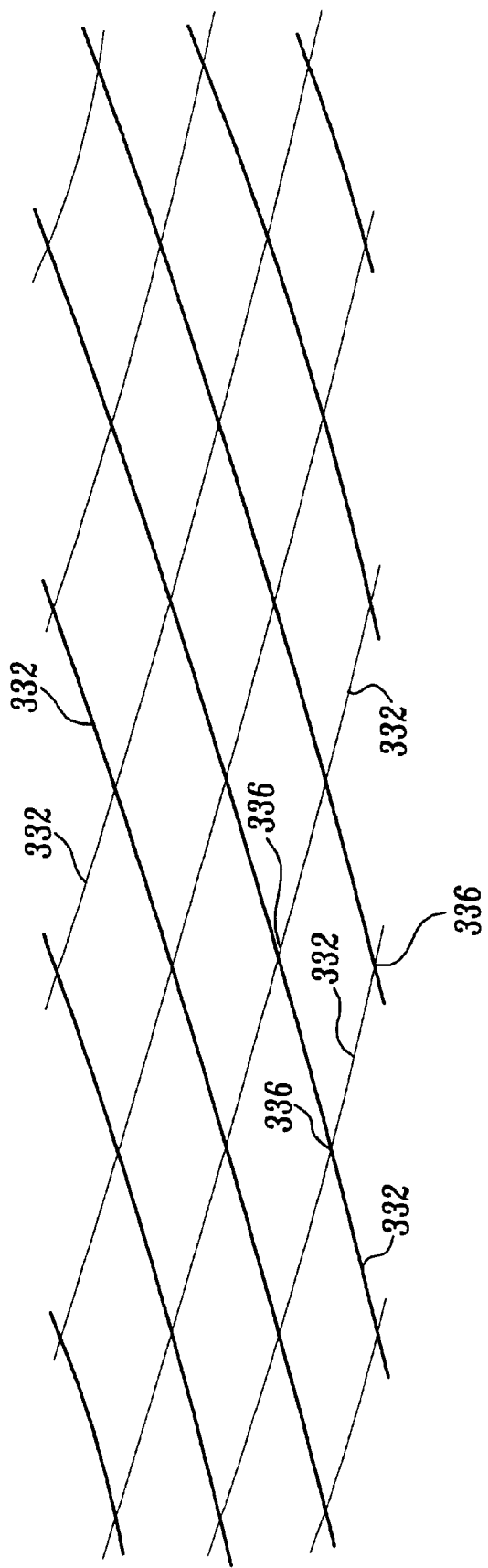

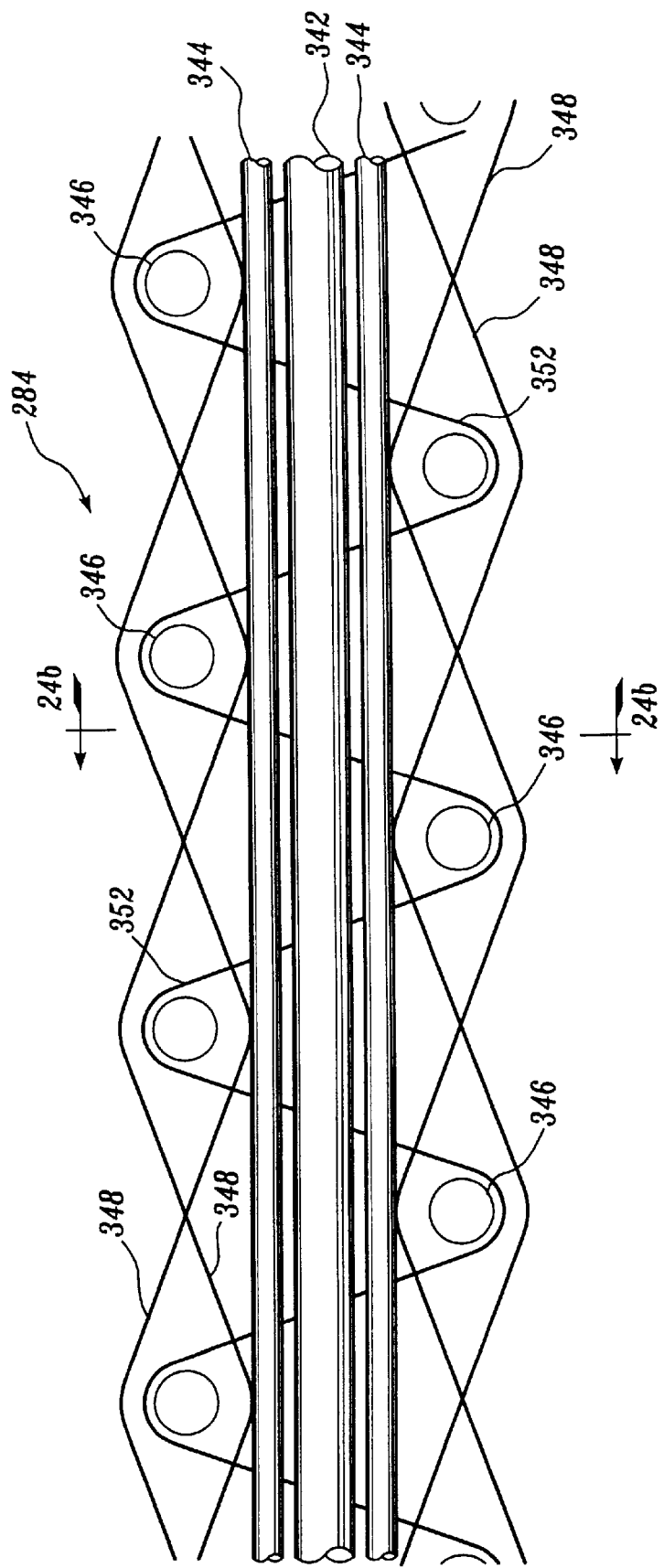

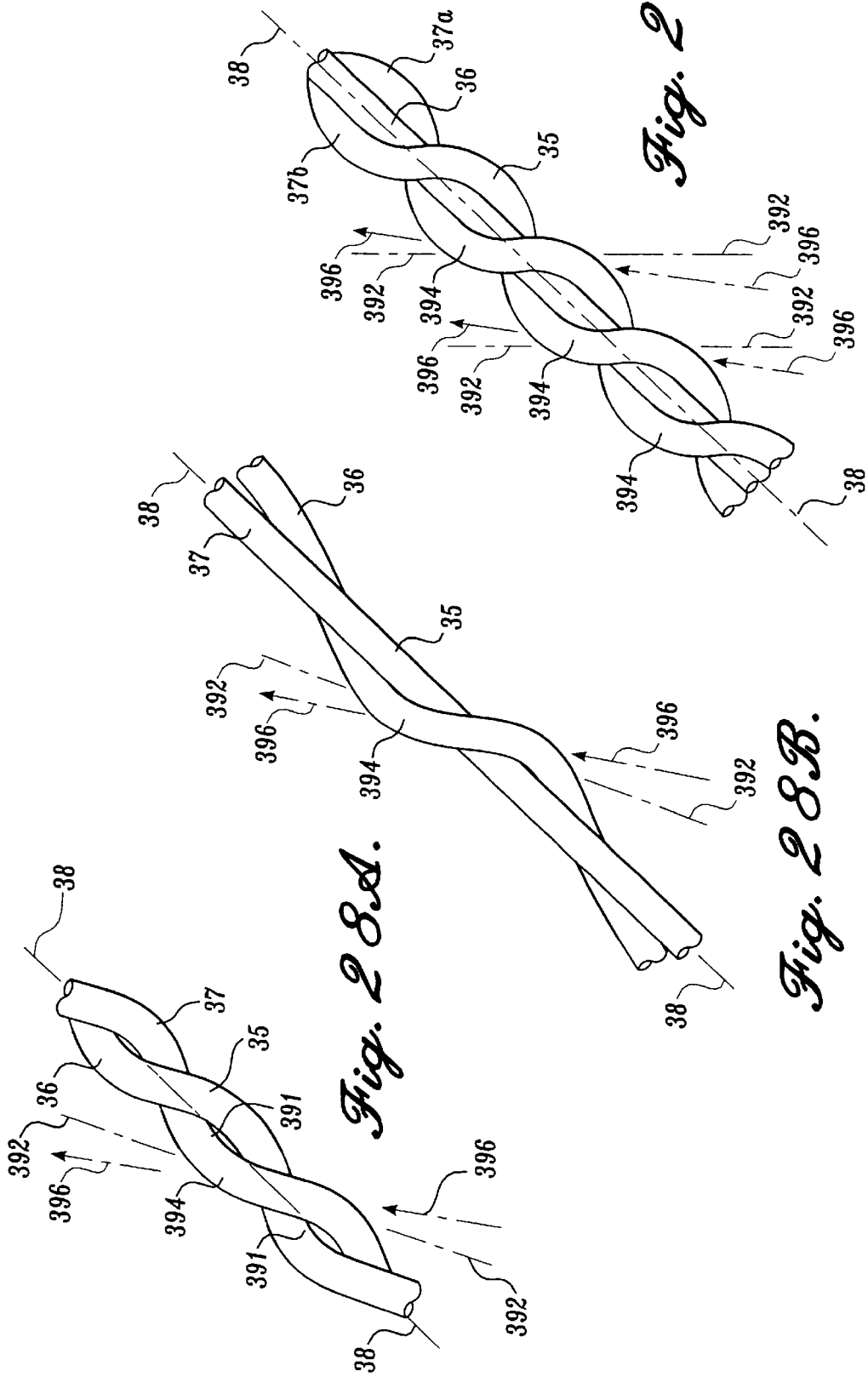

CELL DESIGN FOR A TRAWL SYSTEM AND METHODS

This is a United States national stage application of prior copending International Application No. PCT/US98/07848, filed Apr. 14, 1998, which in turn is a continuation-in-part of prior copending Provisional Application No. 60/043,618, filed Apr. 14, 1997, the benefit of the filing dates of which are hereby claimed under 35 U.S.C. §120.

TECHNICAL FIELD

The present invention relates to an improved mesh cell design for a trawl system (that by definition is iterated or cloned in varying geometric patterns) providing improved shaping and performance, especially when incorporated in mid-water or bottom trawls of such systems.

BACKGROUND ART

It is well understood that the basic cell of a selected portion of every trawl system is the unit cell (called mesh cell hereinafter). The selected portions of the trawl system is then built by repeating the shape of the basic mesh cell.

It is axiomatic that the ability to predict the overall shape and performance of the finished product depends entirely on the shape and structural integrity of that single basic mesh cell. Heretofore, proper trawl making was a two-step process that involved initial construction of undersized mesh cells, and setting the knots and mesh sizes by the substeps of depth stretching and heat setting involving turning the finished mesh in direction opposite to its natural bent and applying first pressure, and then heat to set the knots.

Materials used in mesh cell construction can be plastics such as nylon and polyethylene but other types of natural occurring fibers also can be (and have been) used. Single, double (or more) strands make up a thread or twine composed of, say, nylon, polyethylene and/or cotton. Additionally, in making the mesh portion of conventional trawls particularly mid-water trawls especially the forward section mesh portion thereof, braided cords and twisted ropes of natural and synthetic materials, bonded and unbonded, and cables have been used. However, the pitch of any braided or twisted thread, such as a twine, cord and/or rope (distance between corresponding points along one of the strands constituting one turn thereof which is analogous to the pitch between corresponding screw threads) either has usually been small, or has produced shallow or narrow depressions. Conventional trawl making practices balance the towing force generatable by a vessel against the largest possible trawl for a particular fishing condition, i.e. a trawl having the minimum possible drag. Thus, conventional trawl makers are taught to use the smallest possible diameter twine to reduce drag. Accordingly, meshes in conventional trawls, and especially the mesh of the forward sections of mid-water trawls, have been made of twines, including conventional three strand twisted twines of any pitch including loose pitch, that have relatively shallow or narrow and uniform spiral depressions, or smaller diameter braided twines having an equivalent breaking strength. Moreover, modern manufacturing processes using threads, such as twines, cords, cables or ropes to form mesh cells, have always been designed to produce mesh cells in which twist direction of the individual bars comprising each mesh cell, if any, is always the same. None have proposed the systematic and regular use of differently oriented twist for individual mesh bars of the mesh cell in the manner of the present invention.

Even though various Japanese Patent Applications superficially describe mesh cells for nets in which mesh bars have differing lay directions, (see for example, Jap. Pat. Apps. 57-13660, 60-39782 and 61-386), the mesh bars employ conventional, essentially smooth twine or rope. The patent applications disclose differing lay directions of conventional, essentially smooth twine or rope for balancing residual torque within the net structure during its deployment and use, not for generating lift that enhances of trawl system performance. The first-mention Application, for example, states that its purpose is to provide "net legs with different twist directions according to a fixed regular pattern so that torsion and torque of said net legs are mutually canceled." The use of conventional, essentially smooth twine or rope will not yield substantial lift any different from conventional nets.

As set forth in published Patent Cooperation Treaty ("PCT") International Patent Application, International Publication Number WO 97/13407, International Publication Date Apr. 17 1997, ("the PCT patent application") it has been recently discovered that threads, such as twines, cords, braided cords, cables, ropes or straps, may be advantageously twisted, during assembly of trawl net meshes into a loose, corkscrew-shaped pitch establishing helical grooves that are deeper and/or broader than the depressions in conventional tightly or loosely twisted multi-strand ropes or cables making up conventional mesh bars. During field operations in a water entrained environment, properly orienting mesh bars having the loose, corkscrew-shaped pitch produces lift that increases a performance characteristic of a trawl system such as increased trawl volume (particularly in shallow water) in comparison with a trawl made from conventional mesh, improved trawl shape, and reduced vibration, noise, and drag. Trawl performance improves even though, contrary to conventional trawl design, mesh bars having the loose, corkscrew-shaped pitch have a diameter (or shadow area) larger than corresponding mesh bars of a conventional trawl.

DISCLOSURE OF INVENTION

An object of the present invention is to provide further improved trawl systems.

Yet another object of the present invention is to provide trawl systems having improved performance characteristics.

Briefly, the present invention improves upon the basic discovery disclosed in the PCT patent application that individual bars of a mesh cell can be formed to act as mini-hydrofoils in field operations. During field operations in a water entrained environment, the trawl disclosed in the PCT patent application becomes disposed symmetrically about a central axis. The disclosed trawl includes a plurality of mesh cells, each mesh cell having at least three mesh bars. Each mesh bar in the trawl intersects with at least one other mesh bar. During field operations with the trawl in a water entrained environment, at least a portion of at least one of the mesh bars of at least one of the mesh cells in the trawl exhibits a substantial hydrofoil-like effect that aids in increasing a performance characteristic of a trawl system. That portion of mesh bars in accordance with the present invention which generate substantial hydrodynamic lift is preferably formed from a material that has a substantially incompressible cross-sectional shape, is offset from the central axis of the trawl, and is formed with a hydrofoil shape that:

1. has a lay with a loose, corkscrew-shaped pitch establishing a corkscrewing groove that provides cambered sections; and 2. is oriented to establish leading and trailing edges for that portion of mesh bars which generate hydrodynamic lift.

The lay of that portion of mesh bars which generate hydrodynamic lift has an orientation relative to a receding direction, and the leading edge for that portion of mesh bars which generate hydrodynamic lift, when normalized to the receding direction relative to the central axis, resides at a side of the mesh bar. Pairs of lay and the leading edge are selected for mesh bars from a group consisting of:
  1. a left-hand lay, and the leading edge being a right side of the mesh bar as viewed in the receding direction; and
  2. a right-hand lay, and the leading edge being a left side of the mesh bar as viewed in the receding direction.

If the lay and leading edge are selected from the preceding group, then movement of the mesh bar in accordance with the present invention through the water entrained environment relative to a water flow vector that is neither parallel nor perpendicular to the mesh bar creates a pressure differential across that portion of mesh bars which generate hydrodynamic lift. The pressure differential thus created across such mesh bars establishes a lift vector relative to the central axis of the trawl, most commonly directed away from the central axis of the trawl. Consequently, the lift vector created by movement of the mesh bars which have a portion that generate hydrodynamic lift increases the performance characteristic of the trawl which is selected from a group consisting of substantially increased trawl volume (particularly in shallow water) in comparison with a trawl made from conventional mesh, improved trawl shape, and reduced vibration, noise, and drag.

Various other aspects of the present invention further improve the performance of trawl systems. Thus, properly controlling the shape, arrangement, and distribution of strands assembled to form a mesh bar further improves a trawl in accordance with the present invention. The proper pitch for the loose, corkscrew-shape is advantageously controlled so the pitch of each mesh bar is in a range of $3d$ to $70d$, with a range of $5d$ to $55d$ being preferred, where d is:
  1. for a pair of twisted strands forming a mesh bar, the diameter of the smaller strand of the pair;
  2. for mesh bars that include more than a pair of twisted strands or strands of differing diameters, the diameter of the next-to-largest diameter twisted strand; or
  3. for straps forming a mesh bar, the width of the strap.

Within the preferred pitch range, a pitch of $5d$ to $15d$ generally produces maximum lift for mesh bars formed from product strands, while a pitch of $25d$ to $55d$ generally produces minimum drag for mesh bars formed from product strands.

For mesh bars formed by straps, a pitch of $8d$ to $30d$ generally produces maximum lift, while a pitch of $9d$ to $21d$ generally produces minimum drag. A ratio for the width of the strap to a thickness of the strap is preferably in a range of 1.5:1 to 20:1. Straps for which the ratio is in a range from 2.5:1 to 2.75:1 provide both low drag and good lift. Straps for which the ratio is in a range from 2.75:1 to 10.0:1 provide high lift. Straps for which the ratio is in a range from 1.8:1 to 2.5:1 provide low drag with good lift. Straps for which the ratio is in a range from 1.5:1 to 1.8:1 exhibit lower drag. Straps in the range from 1.8:1 to 2.5:1 may be used advantageously in the mid-section and/or back-end of the trawl. Conversely, straps in the range from 2.75:1 to 10.0:1 may be used advantageously in the front-end, particularly near a leading edge of the trawl.

These and other features, objects and advantages will be understood or apparent to those of ordinary skill in the art from the following detailed description of the preferred embodiment as illustrated in the various drawing figures.

DEFINITIONS

MESH is one of the openings between threads, ropes or cords of a net.

MESH CELL means the sides of a mesh and includes at least three sides and associated knots or equivalent couplers oriented in space. A quadratic mesh cell has four sides with four knots or couplers, and is usually arranged to form a parallelogram (including rectangular and square), with diamond-shaped mesh (trawl mesh) being preferred. A triangular mesh cell has three sides and three knots or couplers. A hexagonal mesh cell has six sides and six knots or couplers.

MESH BARS means the sides of a mesh cell.

CELL means a trawl construction unit, fishing net or the like and includes both a mesh cell relating to enclosable sides of the mesh of the trawl or net itself, as well as to upper bridle and frontropes used in towing the trawl or net through a water column to gather marine life.

CELL BAR means both the sides of a mesh cell and the elements that make up the upper bridle, frontropes and tow lines.

RIGHT- AND/OR LEFT-HANDEDNESS IN A RECEDING DIRECTION along a cell bar involves establishing a central axis for the trawl, net or the like to which the mesh cell associated with the cell bar belongs. Then a normalized imaginary giant stick figure, that is depicted in FIGs. of the PCT patent application, is positioned so his feet intersect the central axis, are rotatable about the central axis, his body penetrates through the cell bar, and his back is positioned perpendicular to and first intersects the water flow vector for the moving trawl, net or the like. The right- and/or left-handedness of the cell bar is then determined using the location of either his right or his left arm irrespective of the fact that the position of the cell bar is offset from the central axis.

THREADS are composed of synthetic or natural fibers. Firstly, for the present invention a thread can comprise two strands twisted along the longitudinal axis of symmetry in a loose fashion with a pitch in a range of $3d-70d$, where d is:
  1. for a pair of twisted strands forming a mesh bar, the diameter of the smaller strand of the pair; or
  2. for mesh bars that include more than a pair of twisted strands or strands of differing diameters, the diameter of the next-to-largest diameter twisted strand. Or secondly, for the present invention a thread can comprise a extruded, woven, braided, or plaited strap that is twisted along its longitudinal axis of symmetry in a loose fashion with a pitch in a range of $3d-70d$, where d is the width of the strap.

STRAP is a flexible element of synthetic or natural fibers that forms a mesh bar, the strap having a cross-section that is generally rectangular or can be quasi-rectangular with rounded short sides and elongated long sides with or without camber. In operation, the strap acts as a hydrofoil, preferably twisted along its longitudinal axis, wherein the short sides form interchanging leading and trailing edges.

PRODUCT STRAND includes the synthetic or natural fibers or filaments used to form the construction unit of the invention which is preferably, but not necessarily, the product of a conventional manufacturing process, usually made of nylon, polyethylene, cotton or the like twisted in common lay direction. Such strand can be twisted, plaited, braided or laid parallel to form a sub-unit for further twisting or other use within a mesh bar or a cell bar in accordance with the invention.

NET is a meshed arrangement of threads that have been woven or knotted or otherwise coupled together usually at regular intervals or at intervals that vary usually uniformly along the length of the trawl.

TRAWL is a large net generally in the shape of a truncated cone trailed through a water column or dragged along a sea bottom to gather marine life including fish.

CODEND is a portion of a trawl positioned at the trailing end thereof and comprises a closed sac-like terminus in which the gathered marine life including fish are trapped.

FRAME is a portion of the larger sized meshes of a net or trawl upon which is overlaid (and attached by a binding) a netting of conventional twist.

PANEL is one of the sections of a trawl and is made to fit generally within and about frames shaped by riblines offset from the longitudinal axis of symmetry of the trawl.

PITCH is the amount of advance in one turn of one product strand twisted about another product strand (or strands) when viewed axially, or common advance of the twist of a strap along its axis of symmetry. For product strands, pitch values are determined with respect to the diameter of the next-to-largest product strand. For straps, pitch values are determined with respect to the width of the strap.

LAY is the direction in which the strands or the strap wind when viewed axially and in a receding direction.

INTERNAL LAY OR TWIST is the direction in which synthetic or natural fibers comprising each product strand are wound when such strand is viewed axially and in a receding direction.

INTERNAL BRAID describes the method of formation of a particular product strand.

FRONTROPE(S) is a term that includes all lines located at perimeter edge of the mouth of the trawl, net or the like, such as headrope, footrope (or bottomrope) and breast lines. The frontropes have a number of connections relative to each other and to the bridle lines.

BRIDLES relates to lines that intersect the frontropes and attach to the tow lines. For a particular port or starboard tow line, a pair of bridles extend from a common connection point therewith, back to the frontropes.

TRAWL SYSTEM is a term that includes the trawl, net or the like in association with the tow lines therefor as well as the bridles lines.

BRIEF DESCRIPTION OF DRAWINGS

FIG. 1 is a illustrative side view of a trawl system depicting a mid-water trawl being towed by a vessel;

FIG. 2 is a detail top view of the trawl of FIG.1;

FIG. 8 is a side view of an alternate trawl system including a mid-water trawl being towed by a vessel;

FIG. 9 is a detail top view of the trawl of FIG. 8;

FIG. 10 is another fragmentary enlargement of a mesh cell included in the trawl depicted in FIGS. 8 and 9;

FIG. 11 a cross-section taken along line 11—11 of FIG. 10 illustrating one possible configuration for straps that form mesh bars of the mesh cell;

FIGS. 12–19 are sections akin to that depicted in FIG. 11 illustrating various alternative configurations for straps;

FIG. 20 is a partially-sectioned elevational view of a strap having a parallelogram cross-sectional shape together with a shackle adapted for use with the parallelogram-shaped strap;

FIGS. 20a and 20b are cross-sectional elevational views of alternatively shaped, parallelogram cross-sectional straps similar to that depicted in FIG. 20;

FIGS. 24a is an elevational cross-sectional view, orthogonal to a longitudinal axis of a woven strap, depicting various fibers that make up the strap;

FIG. 25 is a plan view illustrating fabrication of smaller sized mesh cells using straps using an alternative method to that illustrated in FIGS. 22 and 23;

FIGS. 28a through 28c are plan views illustrating various different configurations for corkscrew-shaped product strands.

BEST MODE FOR CARRYING OUT THE INVENTION

Figure 3:
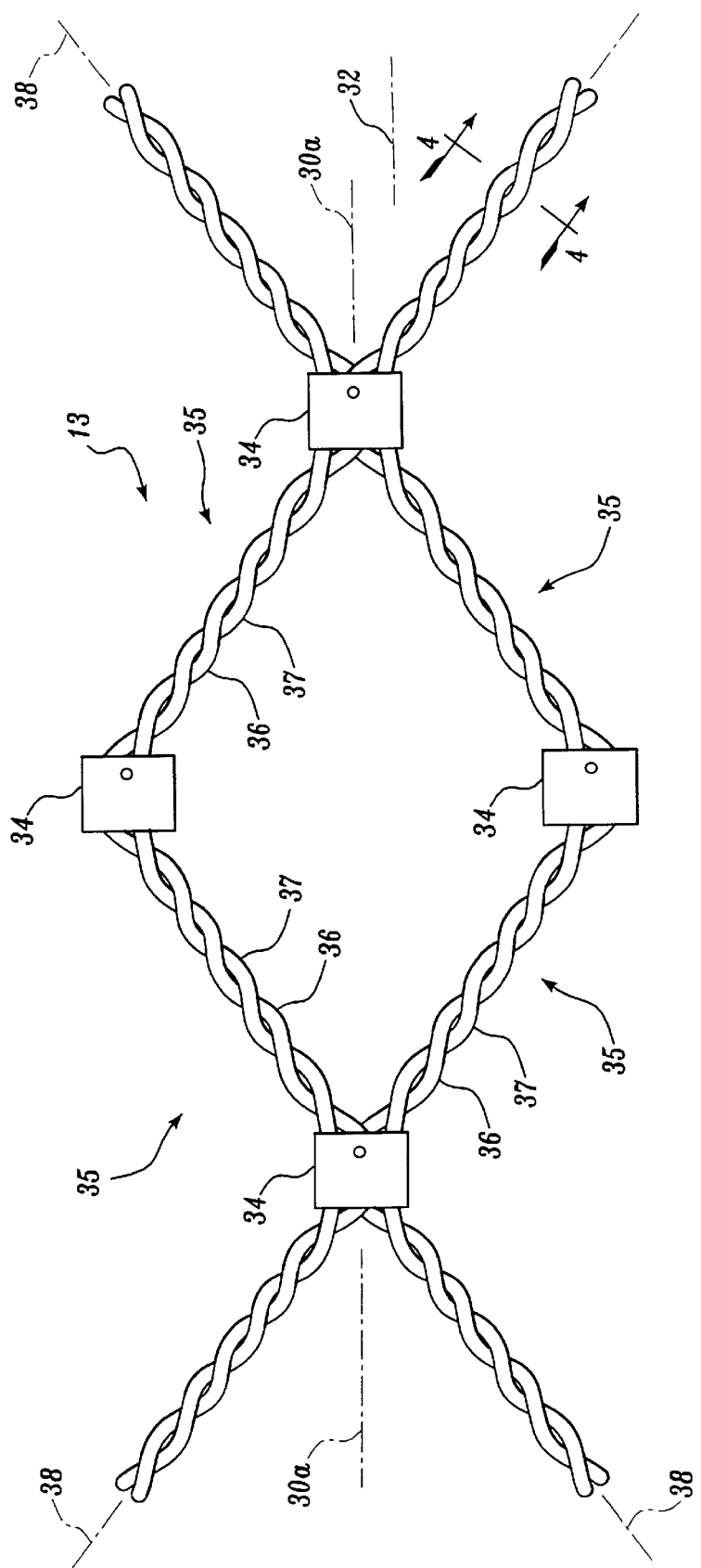
FIG. 3 is a fragmentary enlargement of a mesh cell included in the trawl depicted in FIGS. 1 and 2.

Referring to FIG. 1, a towing vessel 10 at a surface 11 of a body of water 12, tows a mid-water trawl 13 of a trawl system 9. The trawl 13 is positioned between the surface 11 and an ocean bottom 14. The trawl 13 can be connected to the towing vessel 10 in many ways, such as by a main towing line 18 connected through door means 19, towing bridles 20 and mini-bridles 21, 22. A series of weights 23 is attached to mini-bridle 22. Likewise, the shape and pattern of the trawl 13 can vary as is well known in the art. As shown, the trawl 13 has a forward section 24 that includes forward projecting wings 25 for better herding at mouth 26. The forward section 24, including wings 25, is seen to define a mesh size that is larger than that used for a mid-section 27, back-end 28, or codend 29 of the trawl 13.

FIG. 2 illustrates the wing 25 of the trawl 13 of FIG. 1 in more detail and includes a series of mesh cells 30 of quadratic cross-section that are part of panel 31 and are offset from axis of symmetry 32 of the trawl 13. The size of mesh cells 30 is determined by a distance between adjacent knots or equivalent couplers 34. Different sections of the trawl 13, and even different regions within a section, use different size mesh cells 30, which generally form a repeating pattern within that section or region of a section.

As shown in FIG. 3, the mesh cells 30 each have a longitudinal axis of symmetry 30a, and are formed of a series of mesh bars 35 that include several product strands 36, 37. As explained in greater detail below, the product strands 36, 37 may be twisted about a common axis of symmetry 38 in either one of two lay directions: clockwise or counterclockwise as viewed axially along common axis of symmetry 38 and in a receding direction established upstream of the trawl 13. Forming the cork-screw shape of the mesh bars 35 is described in the PCT patent application, that is hereby incorporated by reference.

As indicated in FIGS. 1 and 2, the length of mesh bars 35 varies along the length of the trawl 13. For example, the mesh bars 35 in the forward section 24 have a length of at least 10 ft (304.8 cm). Alternatively, the mesh bars 35 in the mid-section 27 of the trawl 13 have length between 10 ft. (304.8 cm) and 0.75 ft (22.86 cm). The mesh bars 35 of the back-end 28 have a length less than 0.75 ft (22.86 cm).

Figure 4:
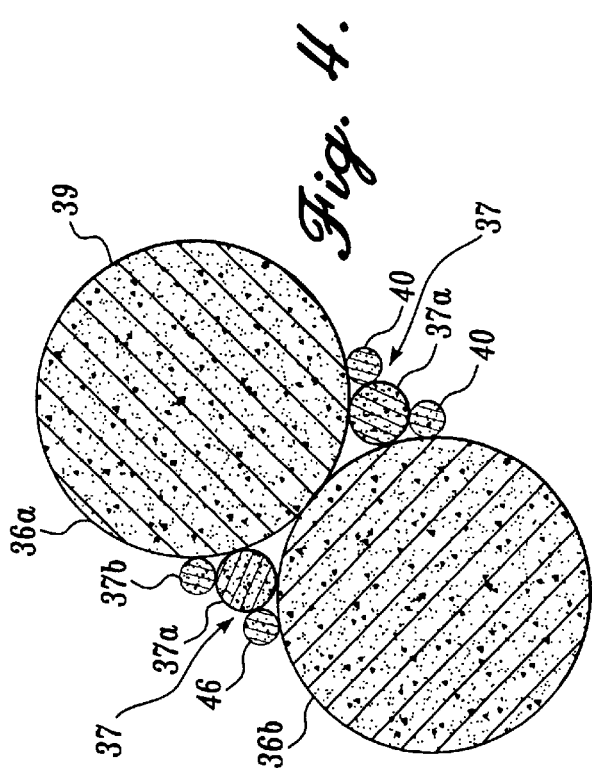
FIG. 4 is a cross-section taken along line 4—4 of FIG. 3 illustrating one possible configuration for product strands that form mesh bars of the mesh cell.

FIG. 4 shows one configuration for the product strands 36, 37 in greater detail. As shown, the product strands 36, 37 vary in diameter wherein principal product strands 36a, 36b are of a larger, equal diameter than auxiliary product strands 37 located in recesses 40 formed between the principal product strands 36a, 36b. Such auxiliary product strands 37 each consists of a product strand 37a of smaller diameter than product strands 36a, 36b sandwiched between a pair of even smaller diameter auxiliary product strands 37b. The larger product strands 36a, 36b have outer surfaces 39 in tangential contact with each other along a single, three dimensional contact curve. The product strands 37 tangentially contact the outer surfaces 39 of the larger product strands 36a, 36b at locations offset from that of the latter. The configuration depicted in FIG. 4 produces a hydrofoil section having surprisingly superior results in operations.

Figure 6:
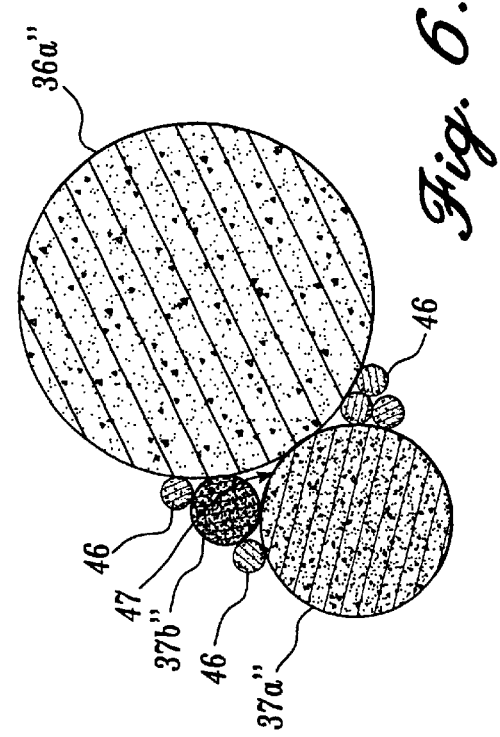
FIGS. 5, 6 and 7 are sections akin to that depicted in FIG. 4 illustrating various alternative configurations of product strands.
Figure 7:
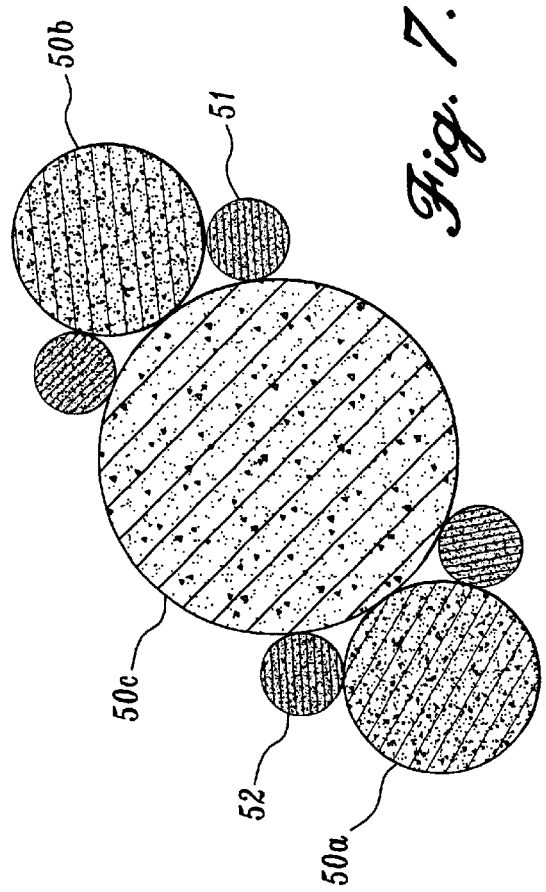
Figure 5:
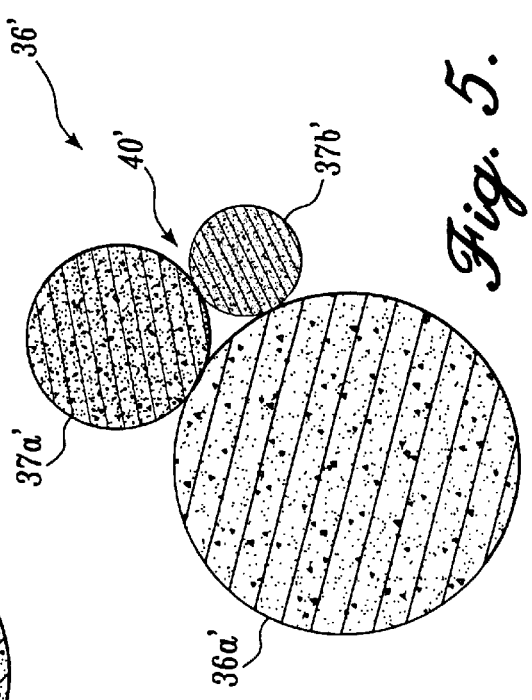

FIGS. 5, 6 and 7 show variations of the invention akin to that depicted in FIG. 4.

FIG. 5 illustrates a variation on the number and shape of the product strands 36, 37. That is, a single larger product strand 36a' can be mounted in tangential contact with smaller strand 37a' with a still smaller strand 37b' located in recesses 40' therebetween.

FIG. 6 illustrates another variation from the configuration depicted in FIG. 5 which adds additional auxiliary product strands 46 of even smaller diameter than those of unequal diameter principal and intermediate product stands 36a", 37a" at tangential positions within recesses 40". That is, such product strands 46 are located in the two recesses 40" formed adjacent to a single tangential contact point 47 between the product stands 36a", 37a".

As shown in FIG. 7, the number, orientation and size of product strands, generally indicated at 50 has changed. Two smaller product strands 50a, 50b of equal diameter sandwich a larger diameter product strand 50c. The product strands 50a, 50b and 50c establish recesses 51 which receive a plurality of much smaller diameter product strands 52. The cross-sectional shape depicted in FIG. 7, even though formed from product strands, approaches that of a strap that will be discussed in greater detail herein below. As a cross-sectional shape of combined product strands approaches that of a strap, parameters for straps, rather than for product strands, should be used in designing the trawl.

It should be pointed out that product strands are synthetic or natural fibers or filaments which are preferably but not necessarily the product of a conventional manufacturing process, usually made of nylon, polyethylene, cotton or the like twisted in common lay direction. Such strand can be twisted, plaited, braided or laid parallel to form a sub-unit for further twisting or other use within mesh bars 35 in accordance with the teachings of the present invention and the PCT patent application. In general, bonded product strands exhibit significantly greater hydrodynamic lift, e.g. a 1.3 to 1.7 or greater increase in lift, than unbonded product strands of identical diameter. To minimize drag while maximizing hydrodynamic lift a densely laid, heat set and bonded product strand, densely braided product strand, or strap, each of which has a substantially incompressible cross-sectional shape and a somewhat roughened surface, is preferred for preserving, during and after assembly of the trawl 13 or 283, the profile and configuration of the mesh bars 35 and 283, as well as that of the cambered sections created by the loose, corkscrew-shape, particularly upon application of tensile forces to mesh bars 35 and 283. Alternatively, in applications where maximizing hydrodynamic lift is a primary consideration and breaking strength and drag requirements are easily satisfied, bonding may be used to make product strands or straps substantially incompressible while reducing manufacturing cost. Bonding resists a tendency for product strands or straps to compress during assembly and field operations, and therefore better preserves designed hydrofoil characteristics of the mesh bars 35 and 283. Variations in applying a bonding material during assembly of mesh bars 35 further permits controlling their external shape and filling gaps between product strands. A urethane polymeric material, or material having similar properties, is adequate as a bonding material.

FIG. 8 shows towing vessel 260 at a surface 261 of a body of water 262 towing a mid-water trawl 263 of a trawl system 264. The trawl 263 is positioned between the surface 261 and a bottom 265, and connected to the towing vessel 260 via main tow lines 268, door means 269, towing bridles 270, mini bridles 270a, and frontropes 271 that include breast-lines 271a, and headropes 271b. A series of weights 272 attach to the towing bridles 270. The trawl 263 is made up of four panels (sides, top and bottom panels), and includes wings 274 for better herding at mouth 275. As shown in FIG. 9, the forward section includes a series of mesh cells 280 of parallelogram design that are offset from a central axis of symmetry 281.

FIG. 10 show the mesh cells 280 in more detail. As shown in FIG. 10, the mesh cells 280 each have an axis of symmetry 282 that is offset from the central axis of symmetry 281 of the trawl 263. Since the shape of the trawl 263 varies along the axis of symmetry 281 from almost cylindrically shaped at the wings 274 to a more frustoconical shape over the remainder, the orientation of the axes of symmetry 282 of individual mesh cells 280 vary with respect to the axis of symmetry 281 of the trawl 263. Thus, with respect to the axis of symmetry 281 of the trawl 263, the axis of symmetry 282 of the mesh cells 280 may be parallel, non-parallel and non-intersecting, and/or non-parallel and intersecting. But note that axes of symmetry 282 of the mesh cells 280 are always offset from the axis of symmetry 281 of the trawl 263. In the illustration of FIG. 10, the mesh bars 283 of each mesh cell 280 are respectively formed by straps 284 arranged in a X-pattern using a series of mechanical connections 285 to maintain such orientation. Each strap 284 is twisted, such direction being normalized to the receding direction of use, as indicated by arrow 286. Such twisting of the straps 284, either left-handed or right-handed as required, occurs about an axis of symmetry 288 of the strap 284 in accordance with the teachings set forth in the PCT patent application. As a result, leading and trailing edges 287 are formed.

FIG. 11 illustrates one possible cross-sectional configuration for the strap 284. The configuration depicted in FIG. 11 is basically a parallelogram with diametrically opposite corners 84a being truncated while diametrically opposite corners 284b have pointed edges. Sides 284c are approximately of equal length. The loose, corkscrew-shaped pitch is directly related to the length between opposite corners 284a, i.e the width of the strap 284. Generally, for generating hydrodynamic lift and reducing drag a densely constructed strap 284, formed from a densely woven and bonded strap material, having a substantially incompressible cross-sectional shape and a somewhat roughened surface is preferred. Variations in applying a bonding material permits controlling the external shape of a strap. A urethane polymeric material, or material having similar properties, is adequate as a bonding material.

FIGS. 12–19 show variations of the invention akin to that depicted in FIG. 11.

In the illustration of FIG. 12, corners 300 of strap 284' are pointed rather than being truncated as depicted in FIG. 11. Opposite corners 301 define angles $\alpha$ and $\beta$ where $\beta > \alpha$. Sides 302 are approximately of equal length so the cross-section is that of an equilateral parallelogram. The loose, corkscrew-shaped pitch is directly related to the lengths between far corners 300.

FIG. 13 depicts a hexagonal cross-section for strap 284" having sides 305 of approximately the equal length. Corners 306 define an included angle $\gamma$ while corners 307 define included angles $\delta$ where $\delta > \gamma$. The loose, corkscrew-shaped pitch is directly related to the length between the corners 306.

Figure 14:
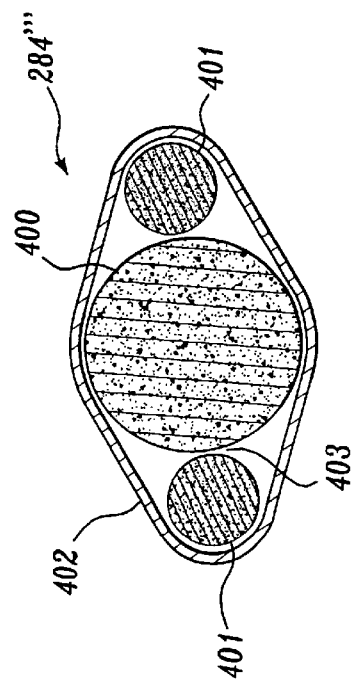

In FIG. 14, strap 284''' is formed of a quasi-rectangular cross-section by the inclusion of a single larger diameter product strand 400 sandwiched between a pair of smaller diameter product strands 401, that are all enclosed within a sheath 402. The smaller diameter product strands 401 make tangential contact with the product strand 400 at contact points 403 lying in a plane that intersects axes of symmetry of the product strands 400, 401.

Figure 15:
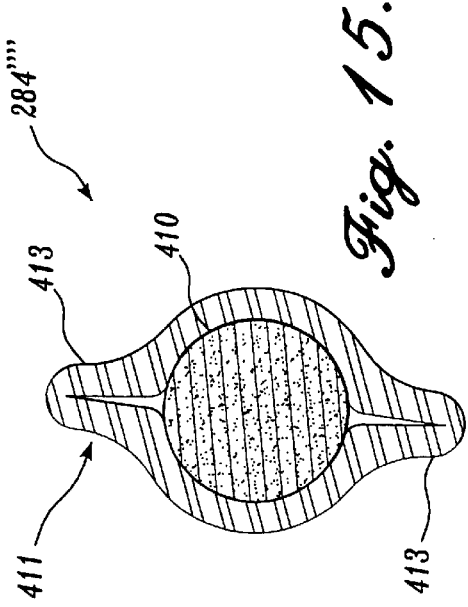

In FIG. 15, strap 284'''' is of a quasi-rectangular cross-section formed of a strand 410 encircled with a larger sheath 411 which is gathered at diametrically opposite locations to form oppositely positioned ridges 413.

Figure 16:
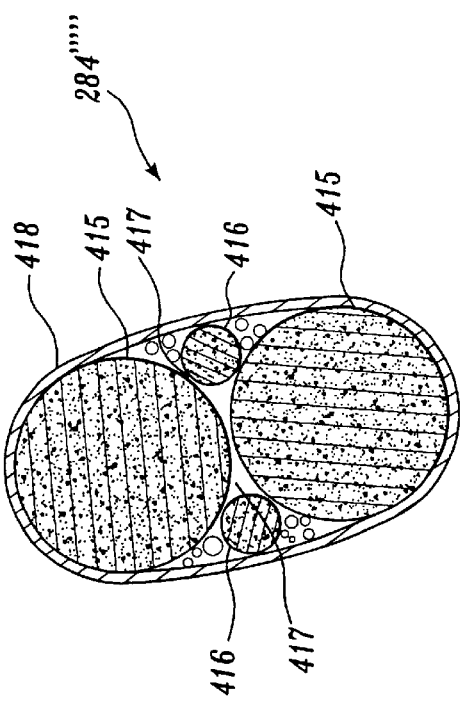

In FIG. 16, the strap 284''''' is formed of a pair of larger diameter strands 415, intermediate diameter strands 416 located within recesses 417 of the larger strands 415, and a series of smaller diameter strands 418, all surrounded by a sheath 420.

In FIG. 17, strap 284'''''' is triangular in cross-section including sides 425 and hypotenuse 426 opposite of right angle Since the side 425a is longer than side 425b, the cross-section is termed "asymmetric".

In FIG. 18, strap 284''''''' is quasi-triangular in cross-section including sides 428 and hypotenuse 429 opposite of right angle $\gamma$. Since the side 428a is longer than side 428b and the fact that the side 428b and hypotenuse 429 are curved (meeting at corner 430), the cross-section is termed "quasi-asymmetric".

In FIG. 19, strap 284'''''''' is again quasi-triangular in cross-section including sides 430 and hypotenuse 431 opposite of right angle $\zeta$. Since the side 430a is longer than side 430b and the fact that the side 430b and hypotenuse 431 are curved (and do not meet at any identifiable location), the cross-section is termed "quasi-asymmetric".

Figure 23:
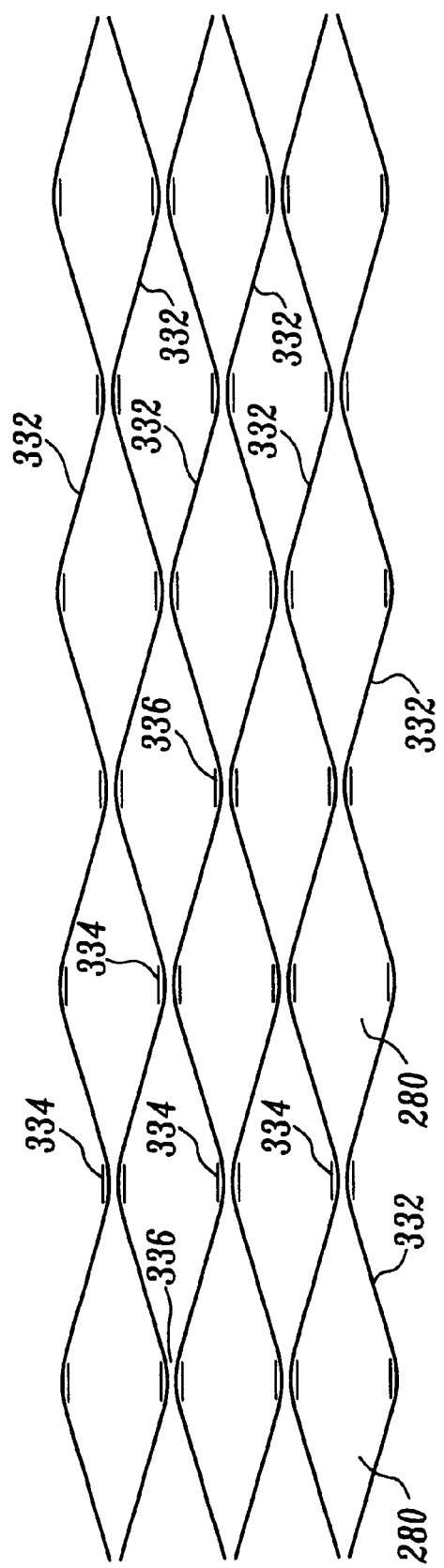
Figure 23B:
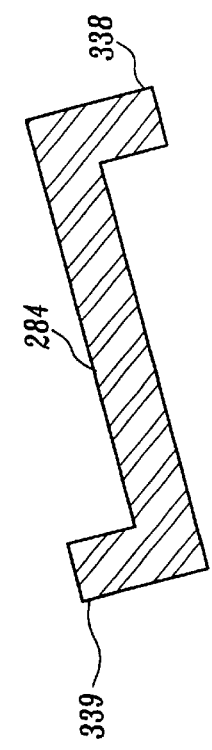
FIGS. 23a–23e are cross-sectional views of alternative embodiment straps having "S" or "Z" cross-sectional shapes.
Figure 23A:
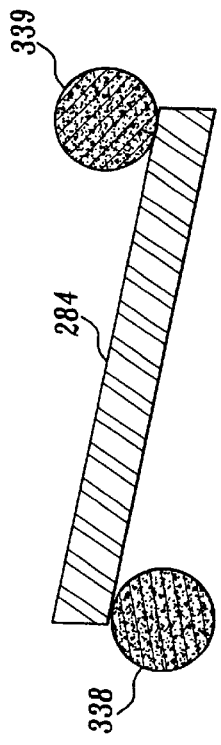
Figure 23C:
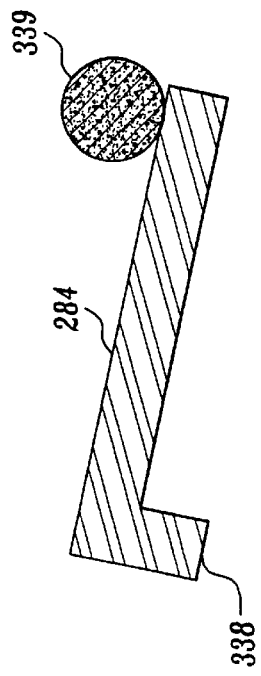
Figure 23E:
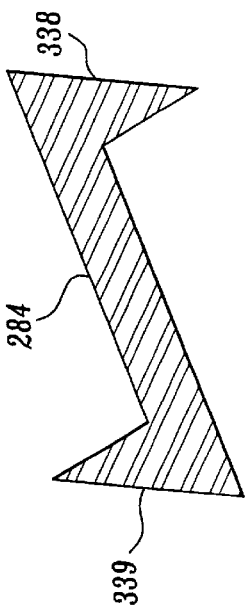
Figure 23D:
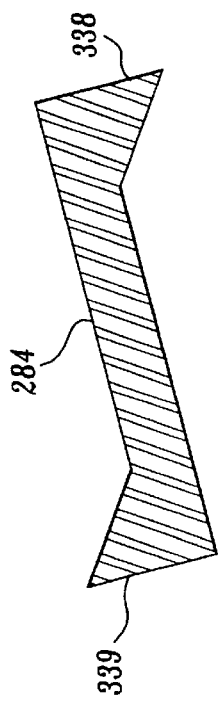

FIGS. 23a through 23c depict various "S" or "Z" cross-sectional shapes that provide improved performance when used for the straps 284 of mesh cells 280. As depicted in FIGS. 23a–23e, the "S" or "Z" cross-sectional shapes for the straps 284 add a drooping leading edge 338 and a raised trailing edge 339 to the rectangular cross-sectional shape of a conventional strap. During testing, twisted straps 284 having a cross-sectional shape such as those illustrated in FIGS. 23a–23e have exhibited greater hydrodynamic lift and lower drag than a simple, rectangularly-shaped strap 284.

FIG. 24a illustrates various fibers that are assembled to form a simple, rectangularly-shaped strap 284. In the illustration of FIG. 24a, spaces between various fibers making up the strap 284 are greatly exaggerated to facilitate illustration of the structure of the strap 284. The fibers of the strap 284 include larger-diameter, longitudinal core fibers 342 which extend along the length of the strap 284. Smaller-diameter longitudinal fibers 344, arranged on both sides of the core fibers 342, also extend along the length of the strap 284. Lateral fibers 346 encircle and bind together the core fibers 342 and longitudinal fibers 344. Surface fibers 348 are woven about he lateral fibers 346 independently on each side of the core fibers 342 and the longitudinal fibers 344. Finally, binder fibers 352 completely encircle the lateral fibers 346 located on both sides of the core fibers 342 and longitudinal fibers 344 thereby securing together the lateral fibers 346, the core fibers 342 and longitudinal fibers 344.

Figure 24B:
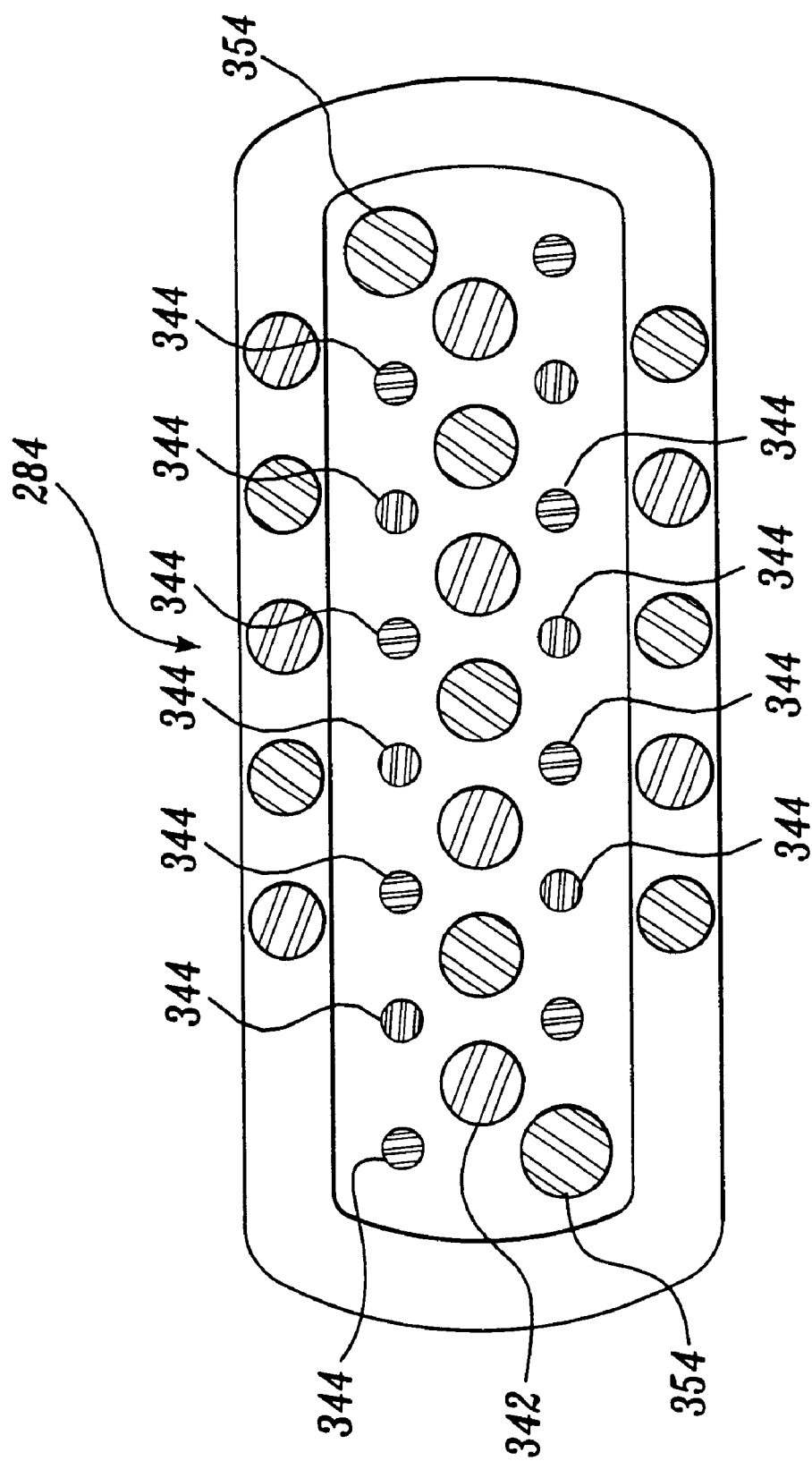
FIG. 24b is an elevational cross-sectional view along the longitudinal axis of the woven strap taken along the line 24b–24b in FIG. 23a having a structure that may be modified to provide a cross-sectional shape similar to those depicted in FIGS. 23a–23e.

FIG. 24b depicts a cross-section of the strap illustrated in FIG. 24a in which two of the smaller-diameter longitudinal fibers 344 located along diametrically opposite edges of the strap 284 have been replaced with larger diameter fibers 354. Modifying the structure of a conventional strap 284 by including two such larger diameter fibers 354 as illustrated in FIG. 24b results in a strap 284 having a cross-sectional shape similar to those illustrated in FIGS. 23a–23e. Appropriately selecting a diameter for the larger diameter fibers 354 permits adjusting the respective extensions of the leading edge 338 and the trailing edge 339.

FIG. 20 illustrates a strap 284 having a cross-sectional shape that is substantially that of a parallelogram, i.e. similar to the shape of the strap 284' depicted in FIG. 12. The parallelogram-shaped strap 284 depicted in FIG. 20 is assembled by appropriately arranging and then laminating together a stack of individual, rectangularly shaped straps 304. In general, the straps 304 may be secured to each other in various ways such as by sewing, clamping, riveting, gluing or an equivalent technique. However, for straps 304 made from polymeric materials lamination appears to be preferably effected by ultrasonic bonding or welding.

Also depicted in FIG. 20 is a shackle 312 that is particularly adapted for use with the strap 284 depicted there. The shackle 312 includes a surface 314 that slopes with respect to a longitudinal axis of the strap 284 extending to the right of the shackle 312. The sloping surface 314 contacts one surface of the parallelogram-shaped strap 284 while a vertical surface 316 of the shackle 312, that is oriented perpendicular to the longitudinal axis of the strap 284 extending to the right of the shackle 312, contacts an adjoining surface of the strap 284. The sloping surface 314 in combination with the vertical surface 316 of the shackle 312 prevent the strap 284 from twisting with respect to the shackle 312 upon application of a tensile stress to the strap 284.

Figure 21:
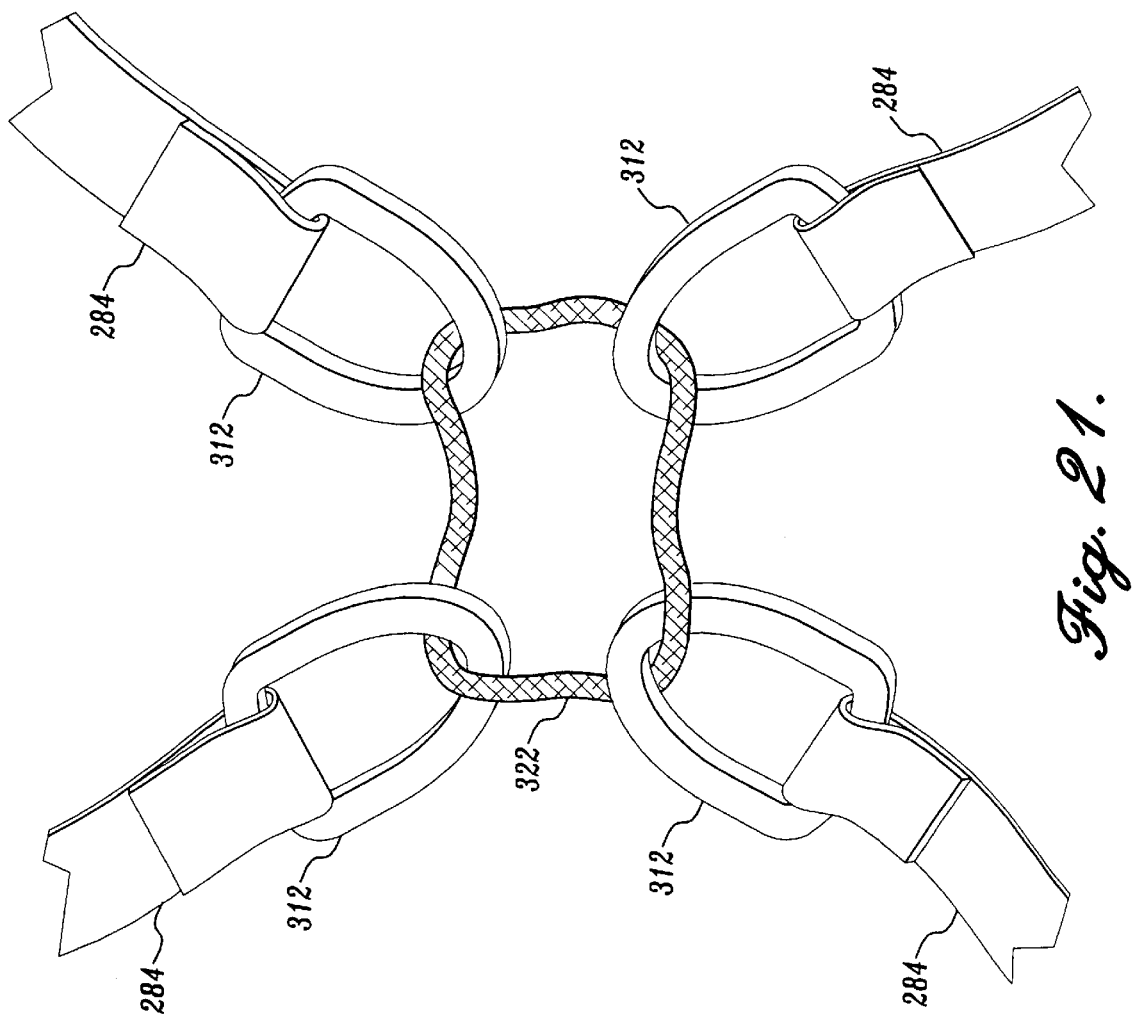
FIG. 21 is a plan view illustrating coupling together four shackles of the type depicted in FIG. 20 to form an X-pattern that is used in assembling parallelogram shaped straps into a mesh cell of a trawl.

FIG. 21 depicts four shackles 312 of the type depicted in FIG. 20 through each of which pass straps 284 having the shape depicted in FIG. 20. The four shackles 312 are flexibly joined together and interconnected by a length of spliced rope 322 to form the X-pattern of larger mesh cells 280 of the trawl 13 depicted in FIGS. 8 and 9, e.g. the mesh cells 280 that form the forward section including wings 274 and a mid-section 276 thereof. In this way the shackles 312 and the spliced rope 322 mechanically join together the straps 284.

FIGS. 20*a* and 20*b* depict alternative embodiments of the parallelogram-shaped strap 284 depicted in FIG. 20. As with the strap 284 depicted in FIG. 20, the straps 284 depicted in FIGS. 20*a* and 20*b* are respectively assembled by laminating together two (2) and four (4) individual, rectangularly shaped straps 304. Even in the absence of twisting, parallelogram-shaped straps 284 such as those depicted in FIGS. 20, 20*a* and 20*b* create a hydrodynamic lifting force that is approximately one-half of the lifting force for the same strap when twisted. The direction of the hydrodynamic lifting force, i.e. horizontally to the left or right in FIGS. 20*a* and 20*b*, depends upon the relationship between the laminated straps 304 and the direction of water flow.

Figure 22:
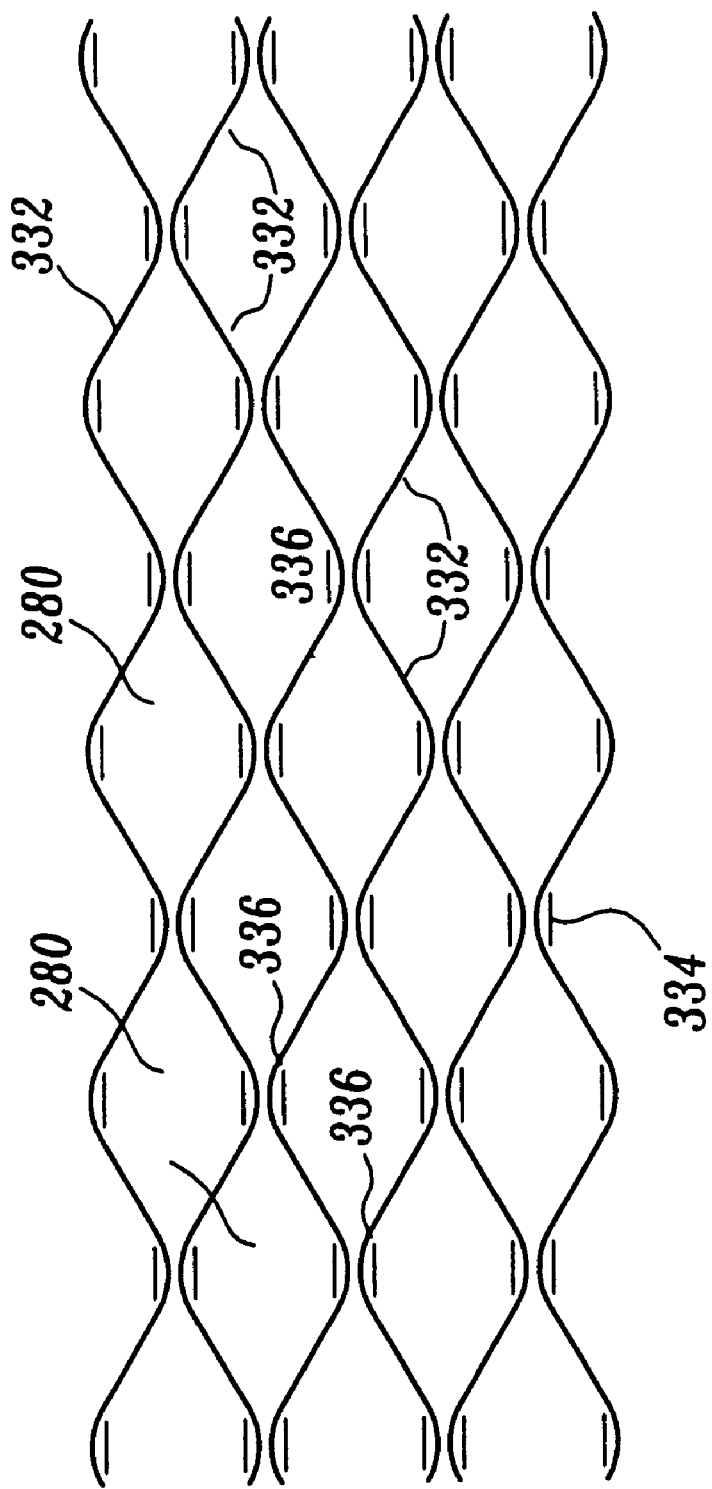
FIGS. 22 and 23 are plan views illustrating fabrication of smaller sized mesh cells using straps.

In addition to using twisted straps for the mesh cells 280 that form the wings 274 and mid-section 276 of the trawl 263, it is also advantageous to use such twisted straps for an back-end 277 and for a codend 278 of the trawl 263. However, since much smaller mesh cells 280 are required for the back-end 277 and for the codend 278 than for the wings 274 and mid-section 276, it is economically impractical to assemble small mesh cells 280, e.g. 4 inch mesh cells 280, in the way illustrated in FIG. 21. Instead, as illustrated in FIGS. 22 and 23, smaller mesh cells 280 may be fabricated by arranging elongated straps 332, preferably made from a polymeric material and twisted as described above, along zigzag rows of pins 334 included in a jig. The arrangement of the twisted straps 332 about the pins 334 juxtaposes short sections 336 of two adjacent straps 332 between immediately adjacent pairs of pins 334. The smaller mesh cells 280 are then established by laminating together the short sections 336, preferably by ultrasonic bonding or welding, or any of the other methods described above. Laminated ultrasonic bonding or welding of the short sections 336 appears to be preferred for maintaining the strength of the strap 332, and to avoid distorting the shape of the twisted straps 332 between successive short sections 336 along each strap 332.

A jig for fabricating the smaller mesh cells 280 may orient the pins 334 either in a horizontal or in a vertical plane. If the jig orients the pins 334 in a horizontal plane, then the straps 332 to be laminated together are arranged between pairs of pins 334 that are located along one edge of the jig while fabricated mesh cells 280 are stored on an opposite side of the jig during assembly and fabrication of immediately subsequent rows of mesh cells 280. If the jig orients the pins 334 in a vertical plane, then the straps 332 to be laminated together are arranged between pairs of pins 334 that are located along an upper portion of the jig while fabricated mesh cells 280 are stored in a lower portion of the jig or on a floor of a fabrication area during assembly and fabrication of immediately subsequent rows of mesh cells 280.

The vertically oriented apparatus for forming the smaller mesh cells 280 from appropriately twisted straps 332 may be adapted for machine arrangement of the straps 332 and machine lamination of the short sections 336. Such a mechanical apparatus for fabricating the mesh cells 280 need employ only two row of pins 334 arranged in the zigzag manner, and then add only two more twisted straps 332 which form two more rows of mesh cells 280 to those mesh cells 280 previously fabricated using the same two zigzag rows of pins 334. Even faster vertically oriented machine fabrication of smaller mesh cells 280 may be effected by establishing a linear array of straps 332 along an upper portion of a machine. All of the straps 332 then feed downward concurrently in a zigzag manner guided by pins that oscillate horizontally back and forth within a single cell in synchronism with the descending straps 332. In this way, the short sections 336 of a particular strap 332 would first be juxtaposed with a short section 336 of a strap located on one side of the particular strap 332, and then subsequently be juxtaposed with a short section 336 of a strap located on the opposite side of the particular strap 332.

Instead, as illustrated in FIGS. 22 and 23, smaller mesh cells 280 may be fabricated by arranging elongated straps 332, preferably made from a polymeric material and twisted as described above, along zigzag rows of pins 334 included in a jig. The arrangement of the twisted straps 332 about the pins 334 juxtaposes short sections 336 of two adjacent straps 332 between immediately adjacent pairs of pins 334. The smaller mesh cells 280 are then fixed by laminating together the short sections 336, preferably by ultrasonic bonding or welding, or any of the other methods described above. Laminated ultrasonic bonding or welding of the short sections 336 appears to be preferred for maintaining the strength of the strap 332, and to avoid distorting the shape of the twisted straps 332 between successive short sections 336 along each strap 332.

In the method illustrated in FIGS. 22 and 23, the straps 332 twist in opposite directions on opposite sides of the pins 334. FIG. 25 illustrates an alternative method for assembling smaller mesh cells 280 for the trawl 263 in which straps 332 extend straight along a line that slopes upward from left to right (indicated by broader lines), or downward from left to right, indicated by narrower lines). Straps 332 that extend in such straight lines have only a single, uniform direction of twist along their entire length, rather than an alternating direction of twist which changes at each of the pins 334*s* in FIGS. 23 and 24. Similar to the assembly method described for FIGS. 23 and 24, the method of depicted in FIG. 25 juxtaposes short sections 336 of two adjacent straps 332. Correspondingly, the smaller mesh cells 280 are then fixed by laminating together the short sections 336 in the manner described above.

Figure 26B:
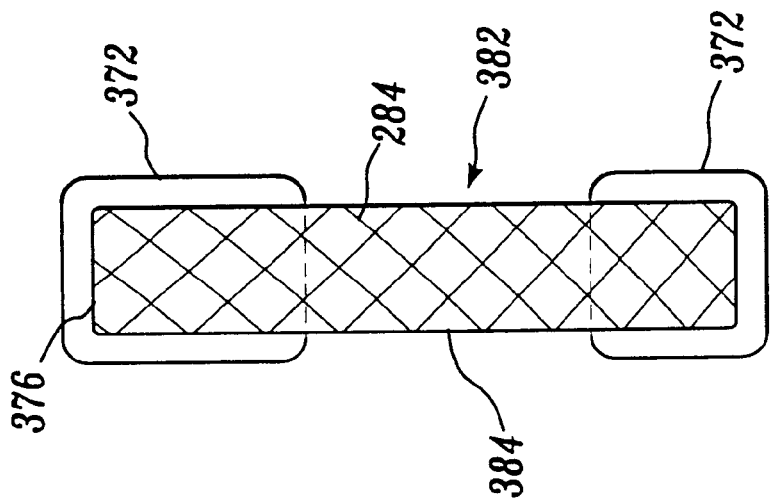
FIGS. 26a and 26b depict cross-sectional shapes for alternative structure straps having angled shaping strips disposed along leading and trailing edges of the straps.
Figure 26A:
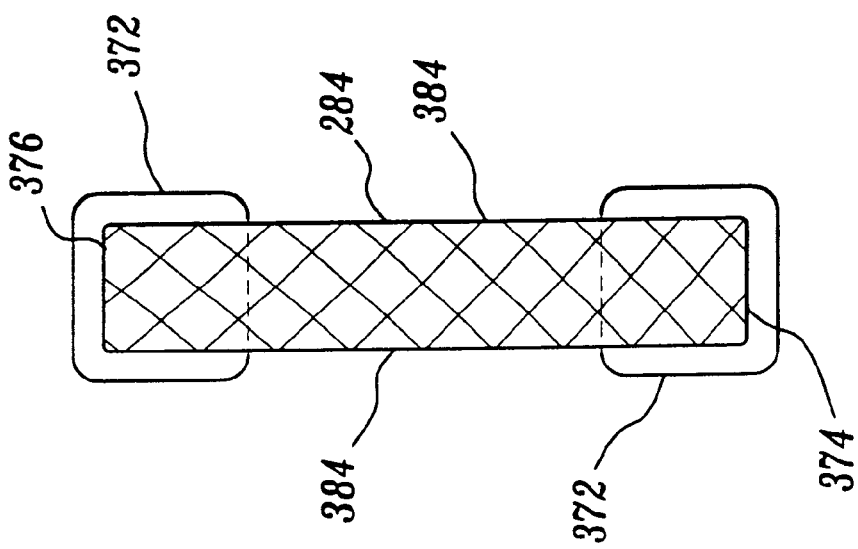
Figure 27A:
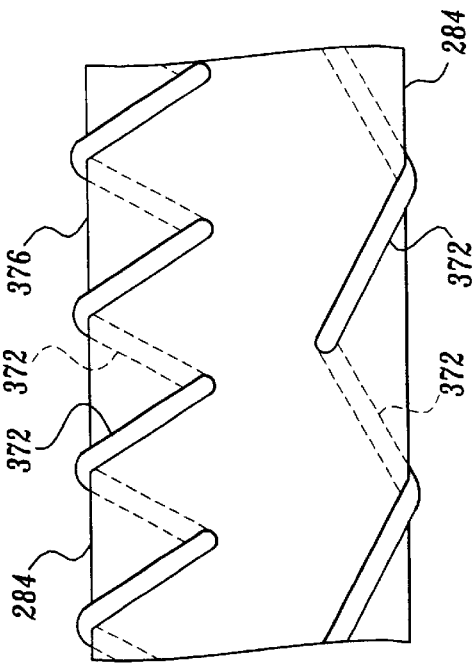
FIGS. 27a and 27b are plan views illustrating shapes for alternative structure straps having angled shaping strips disposed along leading and trailing edges of the straps.
Figure 27B:
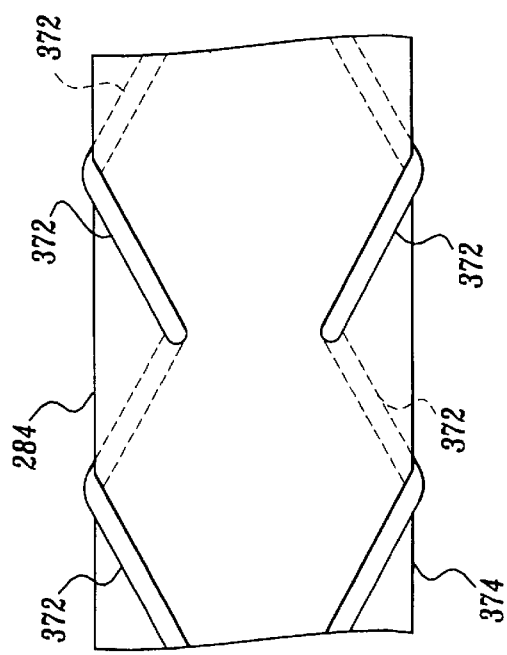

FIGS. 26*a* and 27*a* illustrate straps 284 having symmetrical, angled shaping strips 372 disposed along both a first edge 374 and a second edge 376 of straps 284. As is apparent from the illustrations, the shaping strips 372 alternately project from one side surface 382 and then an opposite side surface 384 of the strap 284. Moreover, the shaping strips 372 wrap around either he first edge 374 or the second edge 376 in passing from one surface 382 to the other surface 384. Properly orienting and positioning the shaping strips 372 projecting from one surface 382 or 384 of the strap 284 with respect to twisting of the straps 284 aligns that portion of the shaping strip 372 on the cambered section substantially parallel to water flow past the mesh bar 283 while the portion of the shaping strip 372 on the other side 384 or 382, which extends between a pair of immediately adjacent cambered sections, is oriented substantially perpendicular to water flow. The straps 284 that include the shaping strip 372 exhibit greater hydrodynamic lift, improved hydrodynamic characteristics under larger twisting pitches, and increased twisting stability. The shaping strips 372 may be formed in various ways such as by stitching. FIGS. 26*b* and 27*b* illustrate straps 284 for which shaping strips 372 disposed along the first edge 374 are formed with a different angle from the shaping strips 372 disposed along the second edge 376 of straps 284.

FIGS. 28a through 28c depict various different configurations for mesh bars 35 having the loose, corkscrew-shaped pitch that establishes deep grooves 391 formed by the corkscrewing of the product strands 36, 37. In the illustration of FIG. 28a, the product strands 36, 37 twist equally about the common axis of symmetry 38, and a dashed line 392 indicates a cutting plane along a cambered section 394 of the mesh bar 35. In that FIG., an arrowed line 396 indicates a possible direction of a water flow vector past the mesh bar 35. A narrowest width of cork-screw-shaped mesh bars 35 having the configuration illustrated in FIG. 28a at a bottom of grooves 391 measured parallel to the direction of the groove with a conventional vernier caliper approaches a diameter of the largest product strand 36 or 37 as the pitch increases, and a widest width at the cambered section 394 is substantially equal to a sum of diameters of the product strands 36 and 37.

While for maximizing hydrodynamic lift and minimizing drag there exists an ideal orientation for the dashed line 392 indicating the cambered section 394 with respect to the arrowed line 396 indicating the water flow vector, the present invention permits engineering a trawl 13 having nearly maximum lift while minimizing drag even though the angular relationship between the dashed line 392 and the arrowed line 396 varies. Thus, the arrowed line 396 may be parallel to the dashed line 392, or may be skewed at an angle on either side of the dashed line 392 as will likely occur due to flexing of the mesh cells 30 of the trawl 13 during field operations in a water entrained environment. However, in assembling the trawl 13 or 263 the loose, corkscrew-shaped pitch of the mesh bars 35 is engineered to properly orient the dashed line 392 indicating the cambered section 394 with respect to the anticipated orientation of arrowed line 396 indicating the water flow vector depending upon the location of a mesh cell 30 or 280 within the trawl 13, and upon the hydrodynamic characteristics of particular product strands 36, 37 or straps 284 assembled into the mesh bars 35 or 283.

FIG. 28b depicts a configuration for the product strands 36, 37 in which the product strand 36 spirals around the product strand 37 which is aligned coaxially with the common axis of symmetry 38. Similar to the illustration of FIG. 28a, the dashed line 392 in FIG. 28b indicates the cutting plane through the mesh bar 35 along the cambered section 394 of the mesh bar 35, and the arrowed line 396 indicates a possible direction of the water flow vector past the mesh bar 35. Also similar to the mesh bar 35 depicted in FIG. 28a, the narrowest width of corkscrew-shaped mesh bars 35 having the configuration illustrated in FIG. 28b at a bottom of grooves 391 measured parallel to the direction of the groove with a conventional vernier caliper approaches a diameter of the largest product strand 36 or 37, and the widest width at the cambered section 394 is substantially equal to the sum of diameters of the product strands 36 and 37. FIG. 28c depicts a configuration for product strands 36, 37 in which a pair of product strands 37 spiral around the product strand 36 which is aligned coaxially with the common axis of symmetry 38. Similar to the illustration of FIGS. 28a and 28b, a pair of dashed lines 392 in FIG. 28c indicate cutting planes through the mesh bar 35 that pass through cambered sections 394, and a pair of arrowed lines 396 indicate possible directions for the water flow vector past different locations along the mesh bar 35. In the forward section 24 of the trawl 13, each mesh bar 35 made of product strands includes a series of at least thirty-five (35) cambered sections 394. In the forward section of the trawl 263, each mesh bar 283 made of straps 284 includes a series of at least twenty-five (25) cambered sections.

Figure 29:
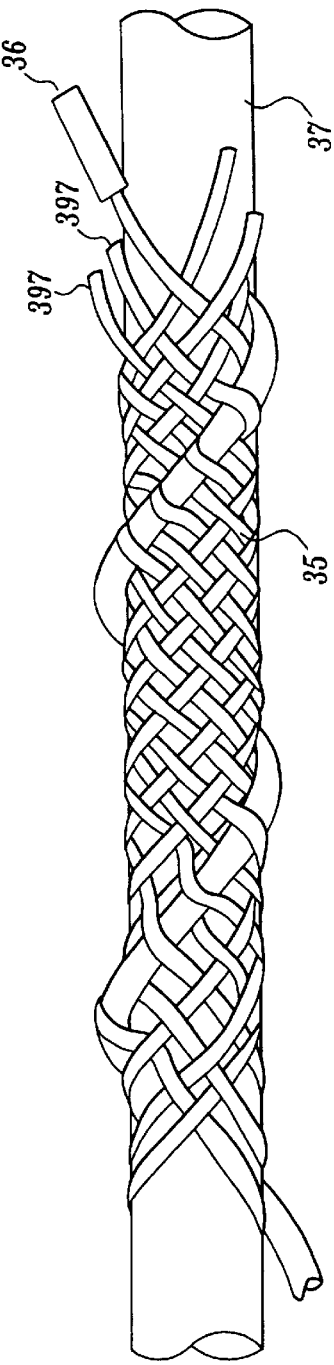
FIG. 29 is a plan view of a mesh bar in which one product strand spirals around another product strand.

One characteristic of the mesh bar 35 depicted in FIG. 28 is that field operations in a water entrained environment apply a force that urges the product strand 36 to slide along the product strand 37. FIG. 29 depicts a configuration for such a mesh bar 35 which prevents the product strand 36 from sliding along the product strand 37 by including the product strand 36 among strands 397 of a conventional braided sheath 398 that encircles the product strand 37.

INDUSTRIAL APPLICABILITY

For many applications, various embodiments of the structures described above for the mesh bars 35 and 283 may be selected for assembly and arranged to form the trawl 13 or 263 so that hydrodynamic lift generated by mesh bars 35 or 283 is directed substantially uniformly away from the axis of symmetry 32 or 281 of the trawl 13 or 263. This configuration for the mesh bars 35 or 283 yields maximum trawl volume. However, for other fishing conditions the orientation and design of the mesh bars 35 or 283 may be arranged so cumulative lift created by the mesh bars 35 or 283 of the bottom panel of the trawl 13 or 263, while directed away from the axis of symmetry 32 or 281 of the trawl 13 or 263, exhibits a lesser magnitude than cumulative lift created by the mesh bars 35 or 283 of the top panel. In this latter configuration, the trawl 13 or 263 exhibits a net upward lift toward the surface 11 or 261 of the body of water 12 or 262.

Although the present invention has been described in terms of the presently preferred embodiments, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A trawl which during field operations in a water entrained environment becomes disposed about a central axis, the trawl comprising:
a plurality of mesh cells, each mesh cell including at least three mesh bars, during field operations of the trawl in a water entrained environment at least a portion of at least one of said mesh bars of at least one of the mesh cells generating hydrodynamic lift that aids in bettering a performance characteristic of a trawl system, the portion of mesh bars which generate hydrodynamic lift being.:
   a. offset from the central axis of the trawl;
   b. formed by a strap assembled by laminating together a plurality of rectangularly shaped straps and having a parallelogram cross-sectional shape so that movement of such mesh bars through the water entrained environment relative to a water flow vector creates a pressure differential across the portion of mesh bars which generate hydrodynamic lift thereby establishing a lift vector relative to the central axis of the trawl, the water flow vector being neither parallel nor perpendicular to the mesh bar; and
   c. each of the mesh bars that generate hydrodynamic lift intersecting with at least one other mesh bar; whereby the lift vector created by movement of the mesh bars which have a portion that generates hydrodynamic lift through the water entrained environment during field operations betters the performance characteristic of the trawl which is selected from a group consisting of increased trawl volume, improved trawl shape, reduced vibration, reduced noise, and reduced drag.

2. The trawl of claim 1 wherein the portion of mesh bars which generate hydrodynamic lift are formed from bonded material.

3. A trawl which during field operations in a water entrained environment becomes disposed about a central axis, the trawl comprising:
   a plurality of mesh cells, each mesh cell including at least three mesh bars, during field operations of the trawl in a water entrained environment at least a portion of at least one of said mesh bars of at least one of the mesh cells generating hydrodynamic lift that aids in bettering a performance characteristic of a trawl system, the portion of mesh bars which generate hydrodynamic lift being:
   a. offset from the central axis of the trawl;
   b. formed with a hydrofoil shape that:
      i. has a lay with a loose, corkscrew-shaped pitch establishing a groove; and
      ii. is oriented to establish leading and trailing edges for the portion of mesh bars which generate hydrodynamic lift, both:
         (1) the lay of the portion of mesh bars which generate hydrodynamic lift having an orientation relative to a receding direction; and
         (2) the leading edge of the portion of mesh bars which generate hydrodynamic lift, when normalized to the receding direction relative to said central axis, residing at a side of said mesh bars, the lay and residence of the leading edge being selected from a group consisting of:
            (a) a left-hand lay, and the leading edge being a right side of said mesh bar as viewed in the receding direction; and
            (b) a right-hand lay, and the leading edge being a left side of said mesh bar as viewed in the receding direction;
         so that movement of such mesh bars through the water entrained environment relative to a water flow vector creates a pressure differential across the portion of mesh bars which generate hydrodynamic lift thereby establishing a lift vector relative to the central axis of the trawl, the water flow vector being neither parallel nor perpendicular to the mesh bar;
   c. each of the mesh bars that generate hydrodynamic lift intersecting with at least one other mesh bar; and
   d. the portion of mesh bars which generate hydrodynamic lift being formed from a bonded material;
   whereby the lift vector created by movement of the mesh bars which have a portion that generates hydrodynamic lift through the water entrained environment during field operations betters the performance characteristic of the trawl which is selected from a group consisting of increased trawl volume, improved trawl shape, reduced vibration, reduced noise, and reduced drag.

4. A trawl which during field operations in a water entrained environment becomes disposed about a central axis, the trawl comprising:
   a plurality of mesh cells, each mesh cell including at least three mesh bars, a first and a second of said mesh bars of at least one of the mesh cells being formed by straps and having at least one interconnecting connection therebetween fixed by laminating together short sections of straps forming the first and the second of said mesh bars, during field operations of the trawl in a water entrained environment at least a portion of both of the first and of the second of said mesh bars generating hydrodynamic lift that aids in bettering a performance characteristic of a trawl system, the portion of mesh bars which generate hydrodynamic lift being:
   a. offset from the central axis of the trawl; and
   b. formed with a hydrofoil shape that:
      i. has a lay with a loose, corkscrew-shaped pitch establishing a groove; and
      ii. is oriented to establish leading and trailing edges for the portion of mesh bars which generate hydrodynamic lift, both:
         (1) the lay of the portion of mesh bars which generate hydrodynamic lift having an orientation relative to a receding direction; and
         (2) the leading edge of the portion of mesh bars which generate hydrodynamic lift, when normalized to the receding direction relative to said central axis, residing at a side of said mesh bars, the lay and residence of the leading edge being selected from a group consisting of:
            (a) a left-hand lay, and the leading edge being a right side of said mesh bar as viewed in the receding direction; and
            (b) a right-hand lay, and the leading edge being a left side of said mesh bar as viewed in the receding direction;
         so that movement of such mesh bars through the water entrained environment relative to a water flow vector creates a pressure differential across the portion of mesh bars which generate hydrodynamic lift thereby establishing a lift vector relative to the central axis of the trawl, the water flow vector being neither parallel nor perpendicular to the mesh bar;
   whereby the lift vector created by movement of the mesh bars which have a portion that generates hydrodynamic lift through the water entrained environment during field operations betters the performance characteristic of the trawl which is selected from a group consisting of increased trawl volume, improved trawl shape, reduced vibration, reduced noise, and reduced drag.

5. The trawl of claim 4 wherein the portion of mesh bars which generate hydrodynamic lift are formed from bonded material.

6. A trawl which during field operations in a water entrained environment becomes disposed about a central axis, the trawl comprising:
   a plurality of mesh cells, each mesh cell including at least three mesh bars, a first and a second of said mesh bars of at least one of the mesh cells being formed by straps and having at least one flexible interconnecting connection therebetween which includes shackles that are joined respectively to the first and second of said mesh bars and are also mechanically joined together, during field operations of the trawl in a water entrained environment at least a portion of both of the first and of the second of said mesh bars generating hydrodynamic lift that aids in bettering a performance characteristic of a trawl system, the portion of mesh bars which generate hydrodynamic lift being:
   a. offset from the central axis of the trawl; and
   b. formed with a hydrofoil shape that:
      i. has a lay with a loose, corkscrew-shaped pitch establishing a groove; and
      ii. is oriented to establish leading and trailing edges for the portion of mesh bars which generate hydrodynamic lift, both:

(1) the lay of the portion of mesh bars which generate hydrodynamic lift having an orientation relative to a receding direction; and (2) the leading edge of the portion of mesh bars which generate hydrodynamic lift, when normalized to the receding direction relative to said central axis, residing at a side of said mesh bars, the lay and residence of the leading edge being selected from a group consisting of:

(a) a left-hand lay, and the leading edge being a right side of said mesh bar as viewed in the receding direction; and (b) a right-hand lay, and the leading edge being a left side of said mesh bar as viewed in the receding direction;

so that movement of such mesh bars through the water entrained environment relative to a water flow vector creates a pressure differential across the portion of mesh bars which generate hydrodynamic lift thereby establishing a lift vector relative to the central axis of the trawl, the water flow vector being neither parallel nor perpendicular to the mesh bar;

whereby the lift vector created by movement of the mesh bars which have a portion that generates hydrodynamic lift through the water entrained environment during field operations betters the performance characteristic of the trawl which is selected from a group consisting of increased trawl volume, improved trawl shape, reduced vibration, reduced noise, and reduced drag.

7. The trawl of claim 6 wherein the portion of mesh bars which generate hydrodynamic lift are formed from bonded material.

* * * * *